US012800360B2

(12) United States Patent
Murakami et al.

(10) Patent No.: US 12,800,360 B2
(45) Date of Patent: Nov. 17, 2026

(54) ENCODER INCLUDING LIGHT RECEIVING REGIONS FOR ECCENTRICITY DETECTION AND METHOD FOR ATTACHING THE SAME

(71) Applicant: Panasonic Intellectual Property Management Co., Ltd., Osaka (JP)

(72) Inventors: Kimihiro Murakami, Osaka (JP); Masaru Shiraishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 118 days.

(21) Appl. No.: 18/718,344

(22) PCT Filed: Dec. 12, 2022

(86) PCT No.: PCT/JP2022/045603

§ 371 (c)(1),
(2) Date: Jun. 10, 2024

(87) PCT Pub. No.: WO2023/127468

PCT Pub. Date: Jul. 6, 2023

(65) Prior Publication Data

US 2025/0060230 A1 Feb. 20, 2025

(30) Foreign Application Priority Data

Dec. 27, 2021 (JP) ................................ 2021-212447

(51) Int. Cl.
*G01D 5/347* (2006.01)

(52) U.S. Cl.
CPC ....... *G01D 5/34794* (2021.05); *G01D 5/3473* (2013.01)

(58) Field of Classification Search
CPC ............ G01D 5/34794; G01D 5/3473; G01D 5/24476; G01D 5/34715; G01P 3/486
See application file for complete search history.

(56) References Cited

U.S. PATENT DOCUMENTS 4,990,909 A * 2/1991 Ueda ..................... G01D 5/145 341/15
5,073,710 A * 12/1991 Takagi .................... G01D 5/38 250/237 G (Continued)

FOREIGN PATENT DOCUMENTS

JP 07-140844 A 6/1995
JP 11-325972 A 11/1999

(Continued)

OTHER PUBLICATIONS

Extended European Search Report dated Mar. 10, 2025 issued in the corresponding European Patent Application No. 22915692.2.

(Continued)

*Primary Examiner* — Jennifer D Bennett
(74) *Attorney, Agent, or Firm* — Rimon P.C.

(57) ABSTRACT

An encoder includes: an emitter that emits light; a rotary plate that rotates and includes an annular region that reflects the light emitted from the emitter, the annular region being provided surrounding a rotation axis of the rotary plate; and a light receiver that receives light emitted from the emitter and arriving via the annular region. The light receiver includes: a first set that includes a first light-receiving region and a second light-receiving region that are arranged side by side in a first direction intersecting a rotation direction of rotary plate; and a second set that includes a third light-receiving region and a fourth light-receiving region that are arranged side by side in a second direction intersecting the (Continued)

rotation direction and that is provided side by side with the first set in the rotation direction.

16 Claims, 18 Drawing Sheets

(56) References Cited

U.S. PATENT DOCUMENTS

| | | | | |
|---|---|---|---|---|
| 2008/0211694 | A1* | 9/2008 | Kawamata | G01D 5/24476<br>341/13 |
| 2010/0224768 | A1 | 9/2010 | Yoshida et al. | |
| 2012/0206024 | A1 | 8/2012 | Yoshida et al. | |
| 2014/0009043 | A1* | 1/2014 | Watanabe | H02K 11/22<br>310/68 B |
| 2015/0122982 | A1* | 5/2015 | Yoshida | G01D 5/3473<br>250/231.13 |
| 2018/0245952 | A1* | 8/2018 | Takahashi | G01D 5/34784 |
| 2021/0010807 | A1 | 1/2021 | Holzapfel et al. | |
| 2021/0072721 | A1* | 3/2021 | Takada | G01D 5/3473 |

FOREIGN PATENT DOCUMENTS

| | | |
|---|---|---|
| JP | 2010-210316 A | 9/2010 |
| JP | 2011-220805 A | 11/2011 |

OTHER PUBLICATIONS

International Search Report dated Feb. 21, 2023 issued in International Patent Application No. PCT/JP2022/045603, with English translation.

* cited by examiner

ENCODER INCLUDING LIGHT RECEIVING REGIONS FOR ECCENTRICITY DETECTION AND METHOD FOR ATTACHING THE SAME

CROSS-REFERENCE OF RELATED APPLICATIONS

This application is the U.S. National Phase under 35 U.S.C. § 371 of International Patent Application No. PCT/JP2022/045603, filed on Dec. 12, 2022, which in turn claims the benefit of Japanese Patent Application No. 2021-212447, filed on Dec. 27, 2021, the entire disclosure of which Applications are incorporated by reference herein.

TECHNICAL FIELD

The present disclosure relates to an encoder and an attachment method.

BACKGROUND ART

Conventional encoders that detect rotation of a detection target, such as a motor shaft, are known. For example, such encoders include components such as a rotary plate that rotates with the detection target and a member for detecting the eccentricity of the rotary plate relative to the detection target. For example, Patent Literature (PTL) 1 discloses an angular velocity detection device. In the angular velocity detection device, sensor members are disposed facing each other across the rotation center of the shaft. Information on the angular velocity obtained from the sensor members is input to a control device to perform arithmetic processing so as to remove an error component in the attachment position of the disk and obtain only the true rotational angular velocity component, and cause a drive motor for the photoconductor drums to output drive pulses that prevent rotational fluctuations.

CITATION LIST

Patent Literature

[PTL 1] Japanese Unexamined Patent Application Publication No. H07-140844

SUMMARY OF INVENTION

Technical Problem

The angular velocity detection device according to PTL 1, however, is not capable of precisely detecting the eccentricity of the rotary plate relative to the detection target.

The present disclosure has been conceived in view of the above circumstances, and aims to provide an encoder etc. capable of precisely detecting the eccentricity of a rotary plate relative to a detection target.

Solution to Problem

An encoder according to an aspect of the present disclosure is an encoder including: an emitter that emits light; a rotary plate that rotates and includes an annular region that reflects or transmits the light emitted from the emitter, the annular region being provided surrounding a rotation axis of the rotary plate; and a light receiver that receives light emitted from the emitter and arriving via the annular region, wherein the light receiver includes: a first set that includes a first light-receiving region and a second light-receiving region that are arranged side by side in a first direction intersecting a rotation direction of the rotary plate; and a second set that includes a third light-receiving region and a fourth light-receiving region that are arranged side by side in a second direction intersecting the rotation direction and that is provided side by side with the first set in the rotation direction.

An attachment method according to an aspect of the present disclosure is an attachment method of attaching an encoder to a detection target, wherein the encoder includes: an emitter that emits light; a rotary plate that rotates and includes an annular region that reflects or transmits the light emitted from the emitter, the annular region being provided surrounding a rotation axis of the rotary plate; and a light receiver that receives light emitted from the emitter and arriving via the annular region, the light receiver includes: a first set that includes a first light-receiving region and a second light-receiving region that are arranged side by side in a first direction intersecting a rotation direction of the rotary plate; and a second set that includes a third light-receiving region and a fourth light-receiving region that are arranged side by side in a second direction intersecting the rotation direction and that is provided side by side with the first set in the rotation direction, and the encoder further includes: an outputter that outputs a signal indicating a value of X expressed as below and a signal indicating a value of Y expressed as below:

$$X = (A1 + B2) - (B1 + A2)$$

$$Y = (A1 + B1) - (A2 + B2)$$

where A1 denotes a signal value corresponding to light received by the first light-receiving region, A2 denotes a signal value corresponding to light received by the second light-receiving region, B1 denotes a signal value corresponding to light received by the third light-receiving region, and B2 denotes a signal value corresponding to light received by the fourth light-receiving region, the attachment method including: attaching the rotary plate to the detection target; and after the attaching, causing the outputter to output the signal indicating the value of X and the signal indicating the value of Y, wherein in the attaching, the rotary plate is attached to the detection target at a position where the value of X indicated by the signal output by the outputter becomes 0 and the value of Y indicated by the signal output by the outputter becomes 0.

Advantageous Effects of Invention

According to the present disclosure, it is possible to provide, for example, an encoder capable of precisely detecting the eccentricity of a rotary plate relative to a detection target.

DESCRIPTION OF EMBODIMENTS

Figure 1:
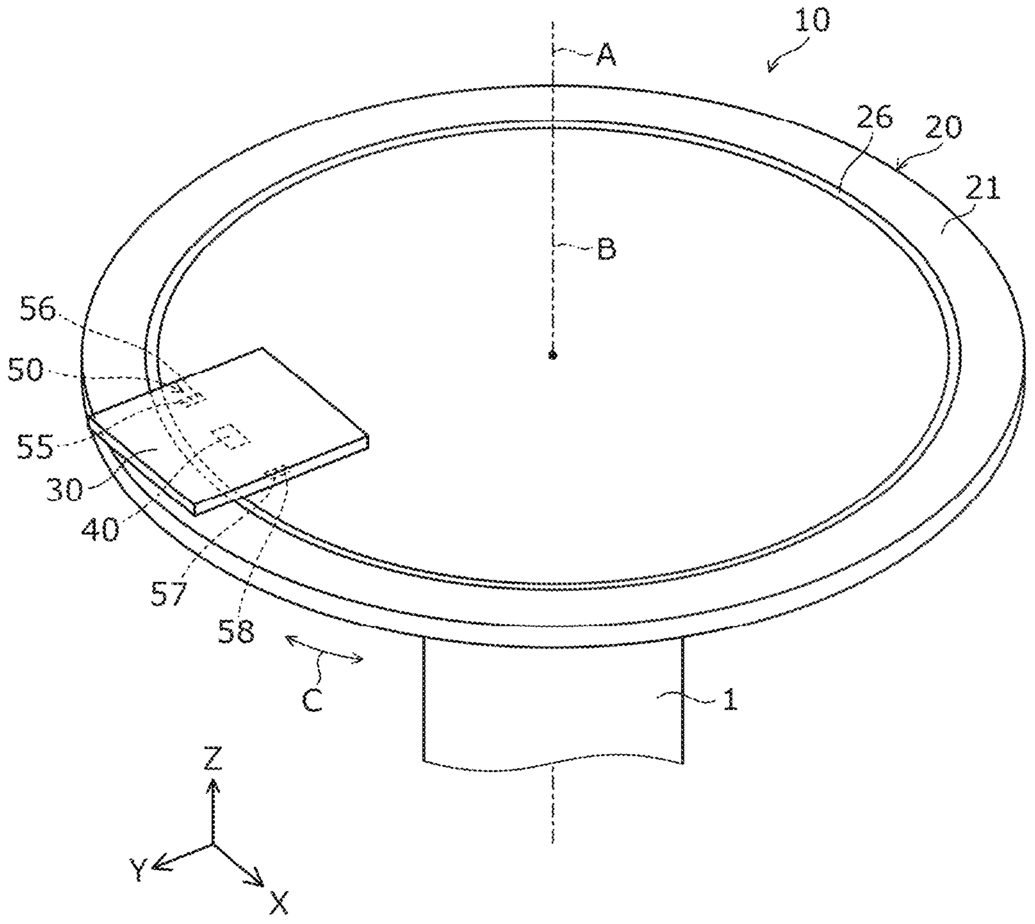
FIG. 1 is a perspective view illustrating an encoder according to Embodiment 1.

Hereinafter, embodiments of the present disclosure will be described. Note that the embodiments described below each show one specific example of the present disclosure. Therefore, the numerical values, constituent elements, the arrangement and connection of the constituent elements, steps, the processing order of the steps etc. shown in the embodiments below are mere examples, and do not intend to limit the present disclosure. Accordingly, among the constituent elements in the embodiments below, those not recited in the independent claims will be described as optional constituent elements.

Also, the drawings are represented schematically and are not necessarily precise illustrations. Note that constituent elements that are substantially the same are given the same reference signs in the drawings, and redundant descriptions thereof will be omitted or simplified.

In the embodiments described below, terms indicating relative attitudes of two directions, such as “parallel” and “orthogonal”, may be used. The meanings of such terms include attitudes that are not strictly the attitudes indicated by the terms. For example, when it is stated that two directions are orthogonal, it not only means that the two directions are completely orthogonal but also means that the two directions are substantially orthogonal unless otherwise specified. That is, it also means that differences of, for example, several percent are included.

Embodiment 1

Figure 2:
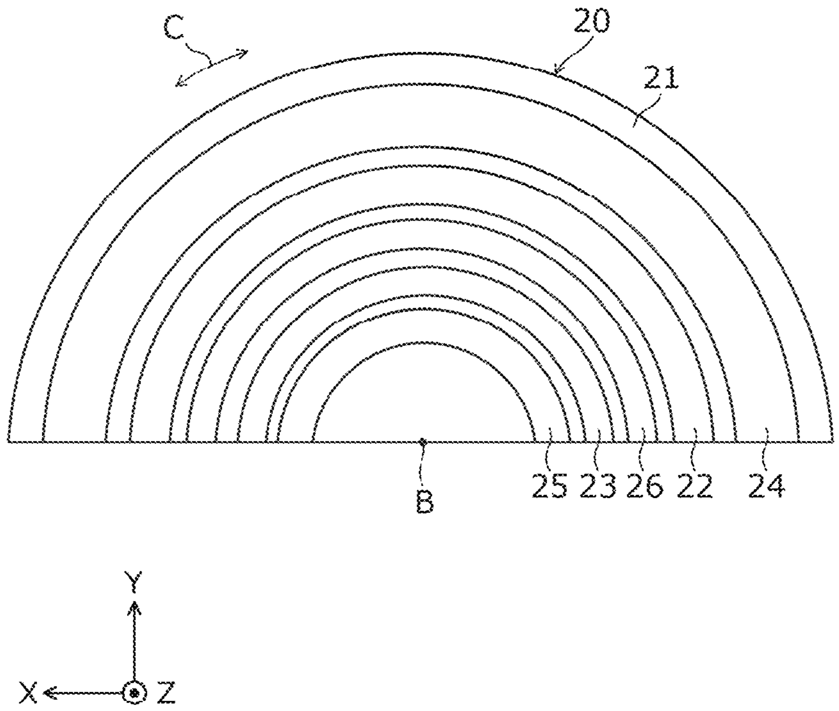
FIG. 2 is a schematic diagram of a rotary plate of the encoder in FIG. 1 as viewed in the axis direction.
Figure 3:
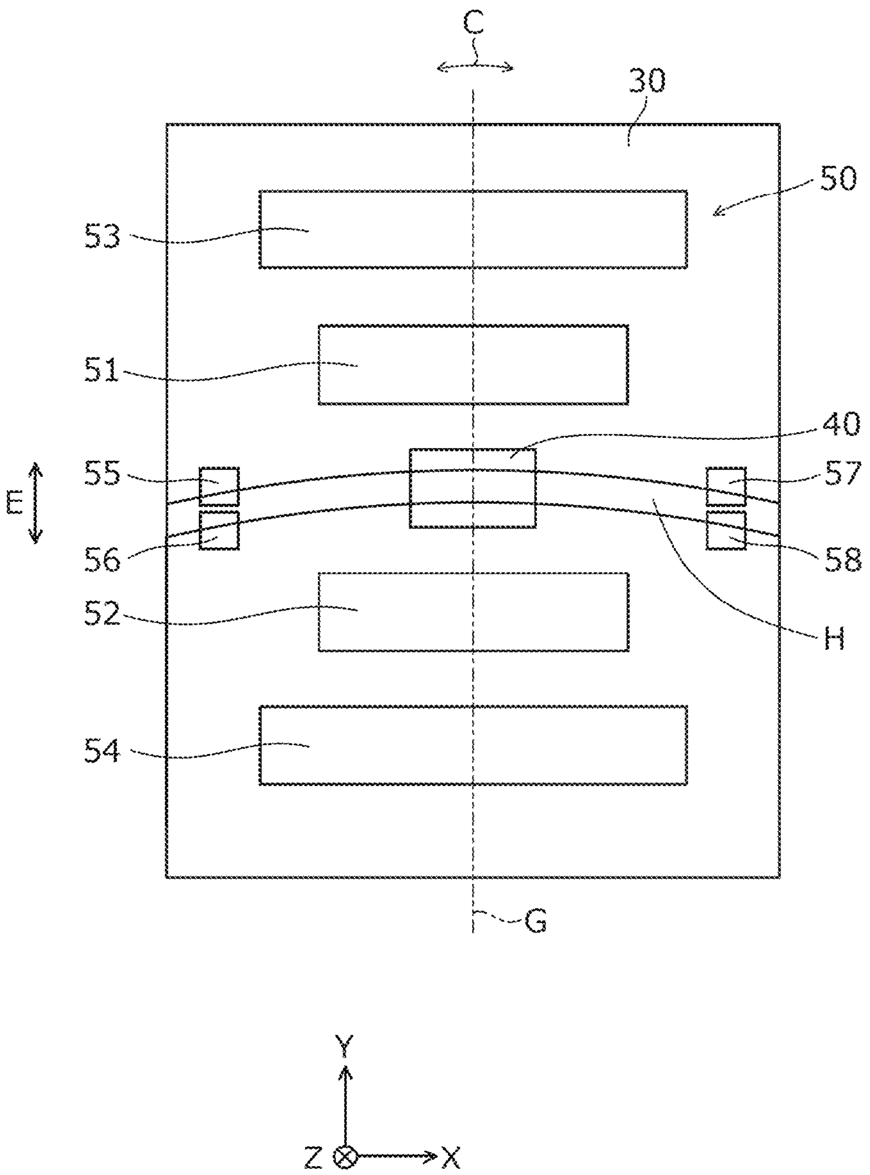
FIG. 3 is a schematic diagram of an emitter and a light receiver of the encoder in FIG. 1 as viewed in the axis direction.
Figure 4:
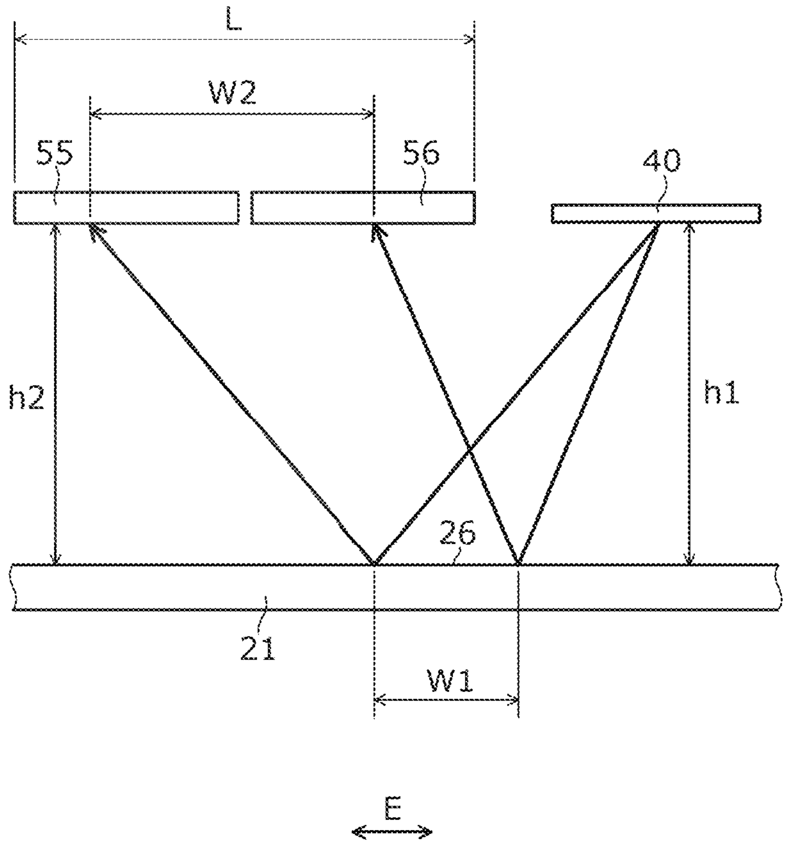
FIG. 4 is an explanatory diagram for describing a relationship between the dimensions of a first light-receiving region and a second light-receiving region and the dimensions of light that irradiates the first light-receiving region and the second light-receiving region in the encoder in FIG. 1.

FIG. 1 is a perspective view illustrating encoder 10 according to an embodiment. FIG. 2 is a schematic diagram of rotary plate 20 of encoder 10 in FIG. 1 as viewed in the axis direction. FIG. 3 is a schematic diagram of emitter 40 and light receiver 50 of encoder 10 in FIG. 1 as viewed in the axis direction. FIG. 4 is an explanatory diagram for describing a relationship between the dimensions of first light-receiving region 55 and second light-receiving region 56 and the dimensions of light that irradiates first light-receiving region 55 and second light-receiving region 56 in encoder 10 in FIG. 1. Encoder 10 will be described with reference to FIG. 1 through FIG. 4.

Note that FIG. 1 omits illustration of first absolute pattern 22, second absolute pattern 23, first incremental pattern 24, second incremental pattern 25, etc., to avoid complication of the drawing. Also, FIG. 2 illustrates only the half of rotary plate 20 to avoid complication of the drawing. In addition, in FIG. 4, emitter 40 and first and second light-receiving regions 55 and 56 are shifted in a first direction to avoid complication of the drawing. Also, the axis direction indicates the direction in which rotation axis A extends (the Z-axis direction in FIG. 1, for example).

As illustrated in FIG. 1, encoder 10 detects rotation of detection target 1. Specifically, encoder 10 detects, for example, the position (rotation position) of detection target 1, the rotation direction of detection target 1, the rotation amount of detection target 1, and/or the rotational speed of detection target 1. Detection target 1 rotates about rotation axis A. In the present embodiment, detection target 1 is the rotation shaft (the shaft) of a motor.

Encoder 10 includes rotary plate 20, substrate 30, emitter 40, and light receiver 50.

As illustrated in FIG. 1 and FIG. 2, rotary plate 20 rotates with detection target 1 about rotation axis A. Rotary plate 20 includes main body 21, first absolute pattern 22, second absolute pattern 23, first incremental pattern 24, second incremental pattern 25, and annular region 26. First absolute pattern 22, second absolute pattern 23, first incremental pattern 24, and second incremental pattern 25 are examples of one or more patterns for detecting the rotation angle of rotary plate 20 (detection target 1).

Main body 21 is in the shape of a plate whose thickness direction is in the axis direction, and is circular as viewed in the axis direction. Main body 21 is attached to one end portion of detection target 1 in the axis direction and rotates with detection target 1 about rotation axis A. The axis of main body 21 coincides with axis B of annular region 26.

First absolute pattern 22 is a pattern for detecting an absolute position of detection target 1. First absolute pattern 22 is provided on a main surface of main body 21 closer to emitter 40 and is annularly provided surrounding rotation axis A. The axis of first absolute pattern 22 coincides with axis B of annular region 26. For example, first absolute pattern 22 includes a reflective portion and a non-reflective portion that are arranged annularly. The reflective portion is a portion that reflects toward light receiver 50 light emitted from emitter 40, and the non-reflective portion is a portion that does not reflect toward light receiver 50 the light emitted from emitter 40.

Second absolute pattern 23 is a pattern for detecting an absolute position of detection target 1. Second absolute pattern 23 is provided on the main surface of main body 21 closer to emitter 40 and is annularly provided surrounding rotation axis A. The axis of second absolute pattern 23 coincides with axis B of annular region 26. Second absolute pattern 23 is provided inwardly of first absolute pattern 22 in the radial direction around axis B of annular region 26. For example, second absolute pattern 23 includes a reflective portion and a non-reflective portion that are arranged annularly. The reflective portion is a portion that reflects toward light receiver 50 light emitted from emitter 40, and the non-reflective portion is a portion that does not reflect toward light receiver 50 the light emitted from emitter 40.

First incremental pattern 24 is a pattern for detecting a relative position of detection target 1. First incremental pattern 24 is provided on the main surface of main body 21 closer to emitter 40 and is annularly provided surrounding rotation axis A. The axis of first incremental pattern 24 coincides with axis B of annular region 26. First incremental pattern 24 is provided outwardly of first absolute pattern 22 in the radial direction around axis B of annular region 26. For example, first incremental pattern 24 includes a reflective portion and a non-reflective portion that are arranged annularly. The reflective portion is a portion that reflects toward light receiver 50 light emitted from emitter 40, and the non-reflective portion is a portion that does not reflect toward light receiver 50 the light emitted from emitter 40.

Second incremental pattern 25 is a pattern for detecting a relative position of detection target 1. Second incremental pattern 25 is provided on the main surface of main body 21 closer to emitter 40 and is annularly provided surrounding rotation axis A. The axis of second incremental pattern 25 coincides with axis B of annular region 26. Second incremental pattern 25 is provided inwardly of second absolute pattern 23 in the radial direction around axis B of annular region 26. For example, second incremental pattern 25 includes a reflective portion and a non-reflective portion that are arranged annularly. The reflective portion is a portion that reflects toward light receiver 50 light emitted from emitter 40, and the non-reflective portion is a portion that does not reflect toward light receiver 50 the light emitted from emitter 40.

Note that, for example, each of one or more patterns for detecting a rotation angle of rotary plate 20 may transmit the light emitted from emitter 40.

Annular region 26 is a ring-shaped region that is provided surrounding rotation axis A and reflects light emitted from emitter 40. Annular region 26 reflects toward light receiver 50 the light emitted from emitter 40. Annular region 26 is provided on the main surface of main body 21 closer to emitter 40. The direction in which axis B of annular region 26 extends coincides with the axis direction. FIG. 1 illustrates the state in which axis B of annular region 26 coincides with rotation axis A. For example, annular region 26 includes a reflective portion that is annularly disposed in a continuous manner and reflects toward light receiver 50 the light emitted from emitter 40.

As illustrated in FIG. 1, substrate 30 is provided facing rotary plate 20 in the axis direction. Substrate 30 is in the shape of a plate whose thickness direction is in the axis direction.

As illustrated in FIG. 1 and FIG. 3, emitter 40 emits light. Specifically, emitter 40 emits light toward rotary plate 20. More specifically, emitter 40 emits light toward first absolute pattern 22, second absolute pattern 23, first incremental pattern 24, second incremental pattern 25, and annular region 26. Emitter 40 is provided on a main surface of substrate 30 closer to rotary plate 20.

Light receiver 50 receives light emitted from emitter 40 and arriving via annular region 26, for example. Light receiver 50 includes first absolute light-receiving region 51, second absolute light-receiving region 52, first incremental light-receiving region 53, second incremental light-receiving region 54, a first set, and a second set. First absolute light-receiving region 51, second absolute light-receiving region 52, first incremental light-receiving region 53, and second incremental light-receiving region 54 are examples of one or more light-receiving regions that receive light emitted from emitter 40 and arriving via one or more patterns.

First absolute light-receiving region 51 receives light emitted from emitter 40 and arriving via first absolute pattern 22.

Second absolute light-receiving region 52 receives light emitted from emitter 40 and arriving via second absolute pattern 23.

First incremental light-receiving region 53 receives light emitted from emitter 40 and arriving via first incremental pattern 24.

Second incremental light-receiving region 54 receives light emitted from emitter 40 and arriving via second incremental pattern 25.

The first set includes first light-receiving region 55 and second light-receiving region 56 that are arranged side by side in first direction E intersecting rotation direction C of rotary plate 20. The second set includes third light-receiving region 57 and fourth light-receiving region 58 that are arranged side by side in second direction F intersecting rotation direction C, and is provided side by side with the first set in rotation direction C. That is to say, third light-receiving region 57 and fourth light-receiving region 58 are provided side by side with first light-receiving region 55 and second light-receiving region 56 in rotation direction C.

In the present embodiment, emitter 40 is interposed between the first set and the second set in rotation direction C. That is to say, emitter 40 is interposed between first and second light-receiving regions 55 and 56 and third and fourth light-receiving regions 57 and 58 in rotation direction C.

Each of first direction E and second direction F is a direction parallel to the plane orthogonal to rotation axis A. In the present embodiment, each of first direction E and second direction F is a direction (Y-axis direction) parallel to straight line G that is orthogonal to rotation axis A, and the first set and the second set are provided line-symmetrically with respect to straight line G. That is to say, first light-receiving region 55 and second light-receiving region 56 are arranged side by side in the direction parallel to straight line G, third light-receiving region 57 and fourth light-receiving region 58 are arranged side by side in the direction parallel to straight line G, and first and second light-receiving regions 55 and 56 and third and fourth light-receiving regions 57 and 58 are provided line-symmetrically with respect to straight line G.

In the radial direction around rotation axis A, first light-receiving region 55 and third light-receiving region 57 are provided at the same position, and second light-receiving region 56 and fourth light-receiving region 58 are provided at the same position.

First light-receiving region 55 and second light-receiving region 56 are provided at respective positions where first light-receiving region 55 and second light-receiving region 56 can receive light (see H in FIG. 3) emitted from emitter 40 and arriving via annular region 26. Third light-receiving region 57 and fourth light-receiving region 58 are provided at respective positions where third light-receiving region 57 and fourth light-receiving region 58 can receive light (see H in FIG. 3) emitted from emitter 40 and arriving via annular region 26.

For example, each of first light-receiving region 55, second light-receiving region 56, third light-receiving region 57, and fourth light-receiving region 58 is a light-receiving region in a light-receiving element. That is to say, for example, light receiver 50 includes a plurality of light-receiving elements.

As illustrated in FIG. 4, in the present embodiment, emitter 40 includes a point light source, and expressions below are satisfied:

$$W2 = (h2/h1) \times W1$$

$$W2/L < 1$$

where h1 denotes the dimension between annular region 26 and emitter 40 in the axis direction, h2 denotes the dimension between annular region 26 and first and second light-receiving regions 55 and 56 in the axis direction, L denotes the dimension between an end portion of first light-receiving region 55 farther from second light-receiving region 56 and an end portion of second light-receiving region 56 farther from first light-receiving region 55 in first direction E, W1 denotes the dimension of annular region 26 in first direction E, and W2 denotes the dimension, in first direction E, of light that is emitted from the point light source and, after being incident on annular region 26, irradiates first light-receiving region 55 and second light-receiving region 56. Note that the same relational expressions are satisfied for third light-receiving region 57 and fourth light-receiving region 58 as well.

Dimension L between the end portion of first light-receiving region 55 farther from second light-receiving region 56 and the end portion of second light-receiving region 56 farther from first light-receiving region 55 in first direction E is greater than dimension W2, in first direction E, of light that is emitted from emitter 40 and, after being incident on annular region 26, irradiates first light-receiving region 55 and second light-receiving region 56. Furthermore, the dimension between an end portion of third light-receiving region 57 farther from fourth light-receiving region 58 and an end portion of fourth light-receiving region 58 farther from third light-receiving region 57 in second direction F is greater than the dimension, in second direction F, of light that is emitted from emitter 40 and, after being incident on annular region 26, irradiates third light-receiving region 57 and fourth light-receiving region 58.

Encoder 10 has been described above.

Figure 5:
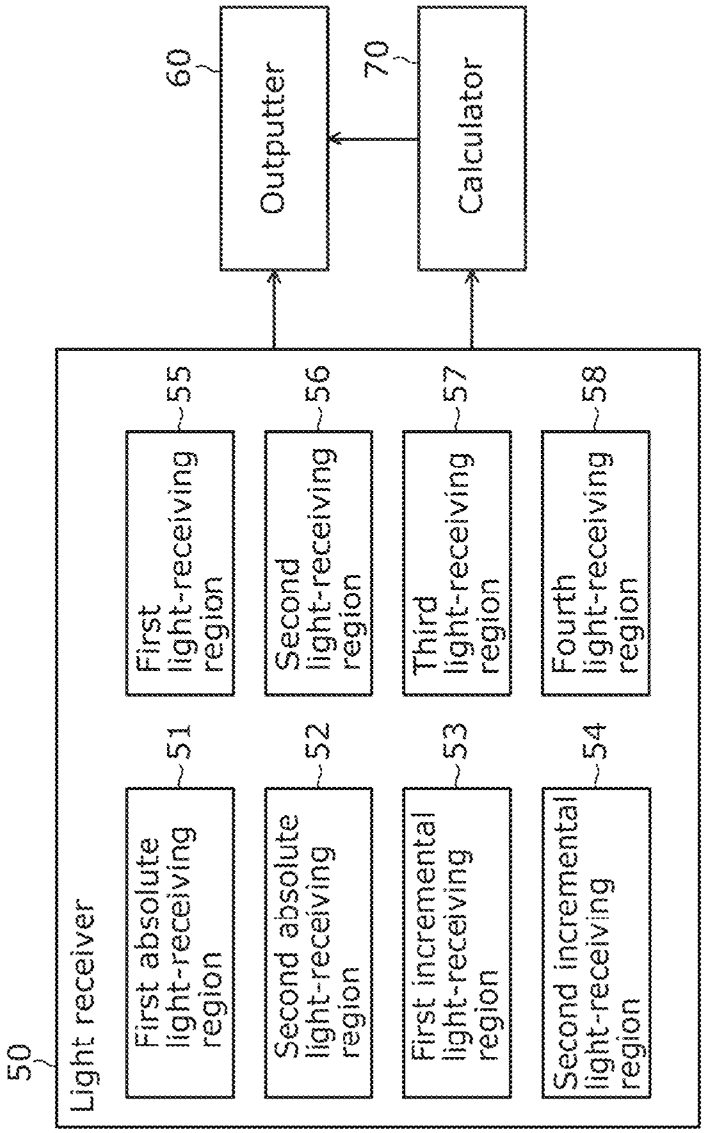
FIG. 5 is a block diagram illustrating a functional configuration of the encoder in FIG. 1.

FIG. 5 is a block diagram illustrating a functional configuration of encoder 10 in FIG. 1. The functional configuration of encoder 10 will be described with reference to FIG. 5.

As illustrated in FIG. 5, encoder 10 further includes outputter 60 and calculator 70. Outputter 60 outputs a signal corresponding to light received by light receiver 50. Specifically, outputter 60 outputs a signal corresponding to light received by first absolute light-receiving region 51, a signal corresponding to light received by second absolute light-receiving region 52, a signal corresponding to light received by first incremental light-receiving region 53, a signal corresponding to light received by second incremental light-receiving region 54, a signal corresponding to light received by first light-receiving region 55, a signal corresponding to light received by second light-receiving region 56, a signal corresponding to light received by third light-receiving region 57, and a signal corresponding to light received by fourth light-receiving region 58. For example, outputter 60 outputs a signal corresponding to the intensity of light received by light receiver 50.

Outputter 60 outputs a signal indicating a value of X expressed as below and a signal indicating a value of Y expressed as below, where: A1 denotes a signal value corresponding to light received by first light-receiving region 55; A2 denotes a signal value corresponding to light received by second light-receiving region 56; B1 denotes a signal value corresponding to light received by third light-receiving region 57; and B2 denotes a signal value corresponding to light received by fourth light-receiving region 58.

$$X = (A1 + B2) - (B1 + A2)$$

$$Y = (A1 + B1) - (A2 + B2)$$

Outputter 60 also outputs a signal indicating a value of Q expressed as below.

$$Q = A1 + B1 + A2 + B2$$

Outputter 60 also outputs a signal indicating a value of X1 expressed as below and a signal indicating a value of Y1 expressed as below.

$$X1 = X/Q$$

$$Y1 = Y/Q$$

Calculator 70 calculates a value of P1 expressed as below, where: P denotes a rotation angle (angle address) of rotary plate 20 detected based on light emitted from emitter 40 and, after being incident on one or more patterns, received by one or more light-receiving regions; Δr denotes an eccentric amount of axis B of annular region 26 relative to rotation axis A (see FIG. 6); Φ denotes an eccentric phase of axis B of annular region 26 relative to rotation axis A (see FIG. 6); and r denotes the radius of annular region 26 (see FIG. 6). As described above, in the present embodiment, the one or more patterns are first absolute pattern 22, second absolute pattern 23, first incremental pattern 24, and second incremental pattern 25, and the one or more light-receiving regions are first absolute light-receiving region 51, second absolute light-receiving region 52, first incremental light-receiving region 53, and second incremental light-receiving region 54.

$$P1 = P + \tan^{-1}(\Delta r \times \sin\Phi / r)$$

or $$P1 = P - \tan^{-1}(\Delta r \times \sin\Phi / r)$$

For example, when Φ=0 through n/2 and when Φ=3n/2 through 2n, calculator 70 calculates a value of P1 by $P1=P+\tan^{-1}(\Delta r\times\sin\Phi/r)$.

Also, for example, when Φ=n/2 through 3n/2, calculator 70 calculates a value of P1 by $P1=P-\tan^{-1}(\Delta r\times\sin\Phi/r)$.

Furthermore, for example, when the value of Y calculated by Y=(A1+B1)−(A2+B2) is positive, calculator 70 calculates a value of P1 by $P1=P+\tan^{-1}(\Delta r\times\sin\Phi/r)$.

Furthermore, for example, when the value of Y calculated by Y=(A1+B1)−(A2+B2) is negative, calculator 70 calculates a value of P1 by $P1=P-\tan^{-1}(\Delta r\times\sin\Phi/r)$.

The details of the calculation method performed by calculator 70 will be described later.

Outputter 60 outputs a signal indicating the value of P1 calculated by calculator 70.

The functional configuration of encoder 10 has been described above.

Figure 6:
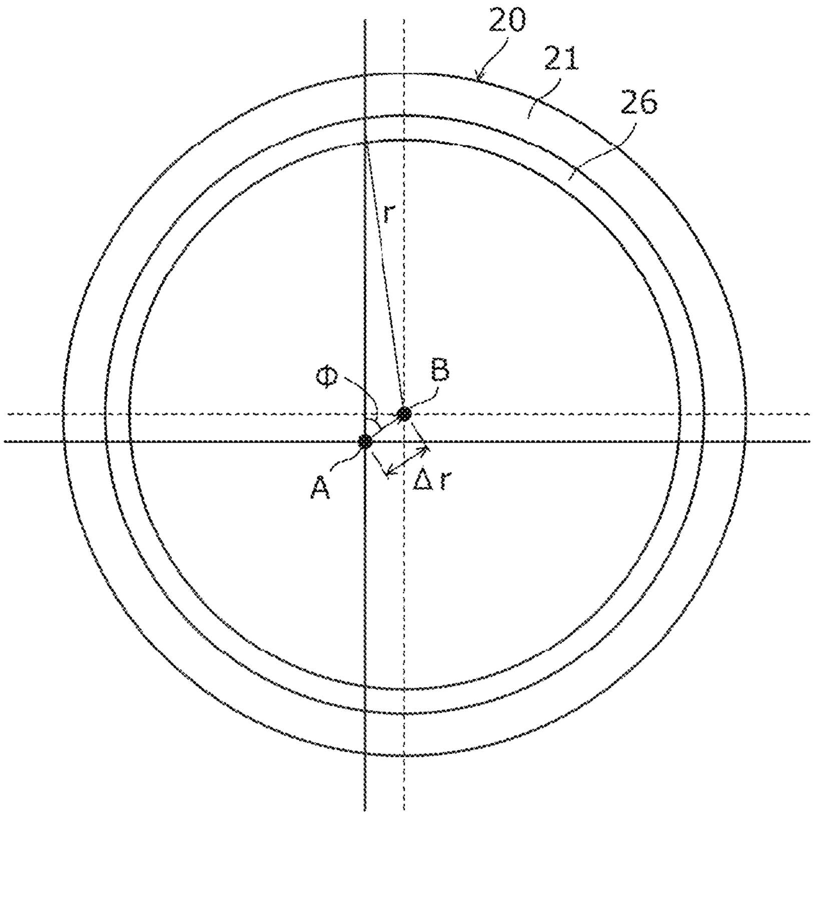
FIG. 6 is a schematic diagram illustrating an example of a state in which the axis of an annular region is eccentric relative to the rotation axis.
Figure 7:
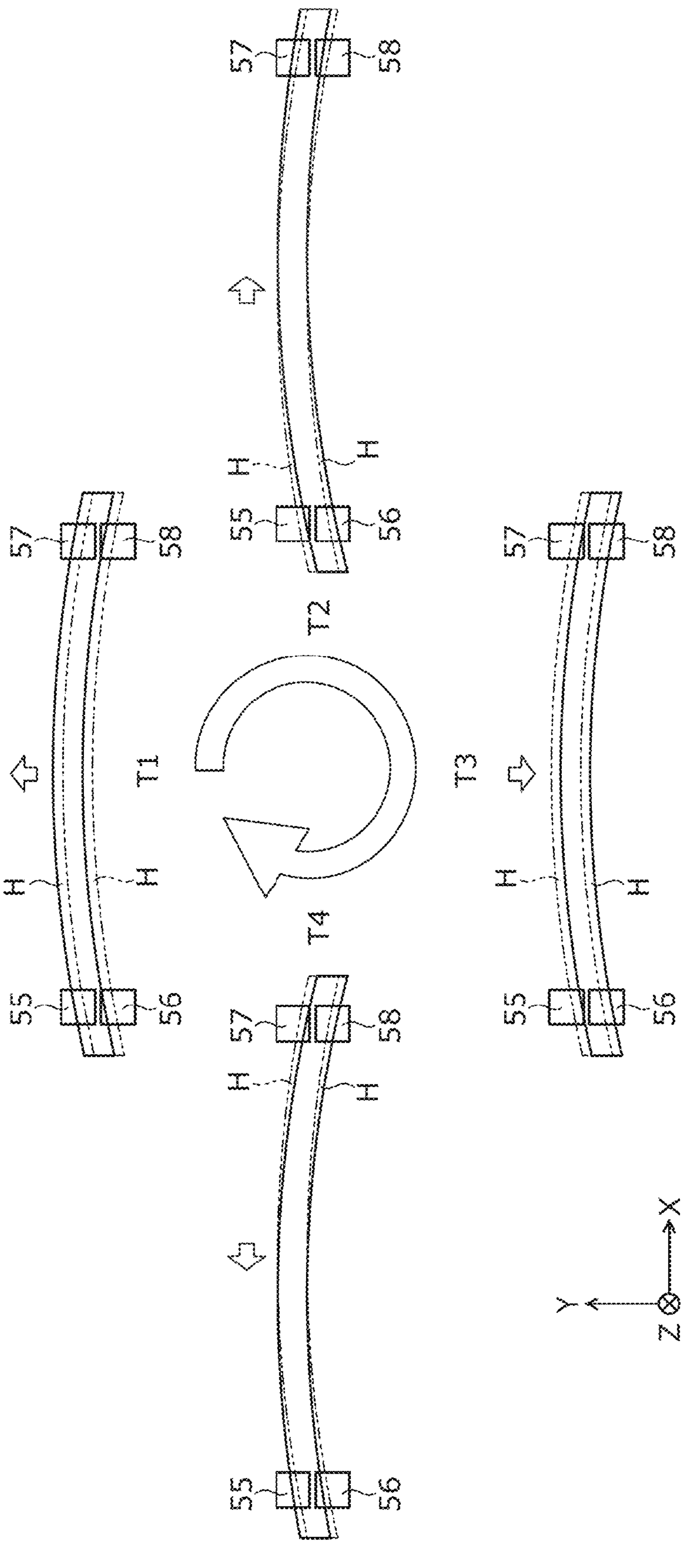
FIG. 7 is a schematic diagram illustrating an example of changes in position of light that irradiates the first light-receiving region, the second light-receiving region, a third light-receiving region, and a fourth light-receiving region, caused by rotation of the rotary plate in the state in which the axis of the annular region is eccentric relative to the rotation axis.
Figure 8:
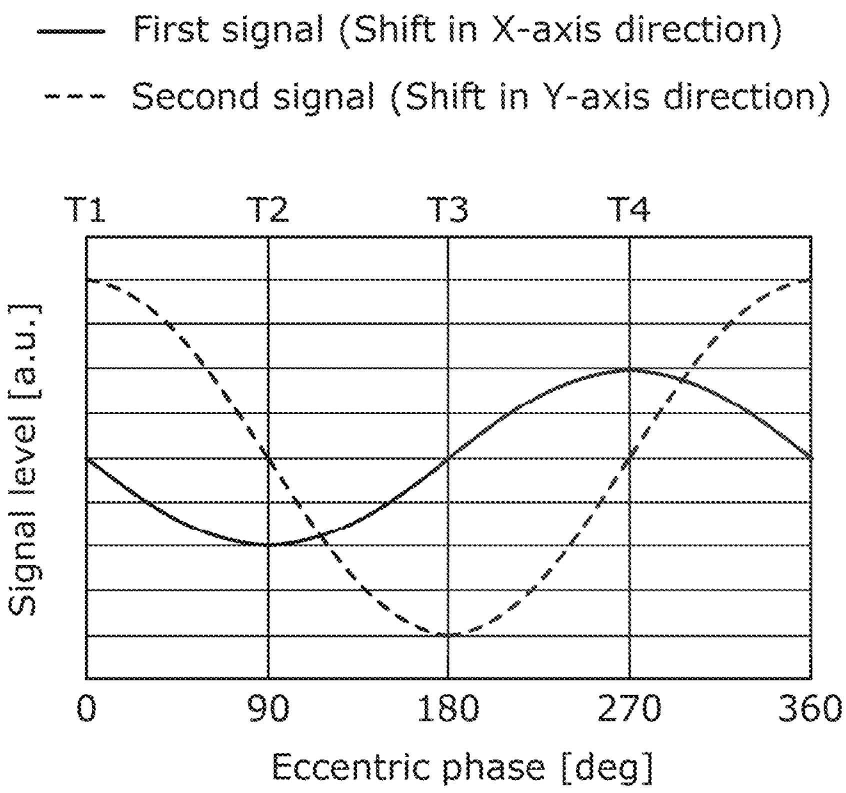
FIG. 8 is a graph illustrating an example of signals output by an outputter when the rotary plate rotates in the state in which the axis of the annular region is eccentric relative to the rotation axis.

FIG. 6 is a schematic diagram illustrating a state in which axis B of annular region 26 is eccentric relative to rotation axis A. FIG. 7 is a schematic diagram illustrating an example of changes in position of light (see H in FIG. 7) that irradiates first light-receiving region 55, second light-receiving region 56, third light-receiving region 57, and fourth light-receiving region 58, caused by rotation of rotary plate 20 in the state in which axis B of annular region 26 is eccentric relative to rotation axis A. FIG. 8 is a graph illustrating an example of signals output by outputter 60 when rotary plate 20 rotates in the state in which axis B of annular region 26 is eccentric relative to rotation axis A. The signals output by outputter 60 will be described with reference to FIG. 6 through FIG. 8.

In the state in which axis B of annular region 26 is eccentric relative to rotation axis A as illustrated in FIG. 6, rotation of rotary plate 20 causes a change in the position of light that irradiates first light-receiving region 55, second light-receiving region 56, third light-receiving region 57, and fourth light-receiving region 58 after being incident on annular region 26.

For example, when rotary plate 20 is in the position indicated by T1 in FIG. 7, light in the state in which axis B of annular region 26 is eccentric relative to rotation axis A is located more to one side in the Y-axis direction than the position of light in the state in which axis B of annular region 26 is not eccentric relative to rotation axis A (see the two-dot-dash line in FIG. 7).

Furthermore, for example, when rotary plate 20 is in the position indicated by T2 in FIG. 7, light in the state in which axis B of annular region 26 is eccentric relative to rotation axis A is located more to one side in the X-axis direction than the position of light in the state in which axis B of annular region 26 is not eccentric relative to rotation axis A (see the two-dot-dash line in FIG. 7).

Furthermore, for example, when rotary plate 20 is in the position indicated by T3 in FIG. 7, light in the state in which axis B of annular region 26 is eccentric relative to rotation axis A is located more to the other side in the Y-axis direction than the position of light in the state in which axis B of annular region 26 is not eccentric relative to rotation axis A (see the two-dot-dash line in FIG. 7).

Furthermore, for example, when rotary plate 20 is in the position indicated by T4 in FIG. 7, light in the state in which axis B of annular region 26 is eccentric relative to rotation axis A is located more to the other side in the X-axis direction than the position of light in the state in which axis B of annular region 26 is not eccentric relative to rotation axis A (see the two-dot-dash line in FIG. 7).

As illustrated in FIG. 8, when rotary plate 20 rotates in the state in which axis B of annular region 26 is eccentric relative to rotation axis A, outputter 60 outputs a signal indicating a shift in the X-axis direction and a signal indicating a shift in the Y-axis direction. These signals show that axis B of annular region 26 is eccentric relative to rotation axis A. Hereinafter, the signal indicating a shift in the X-axis direction may be described as a first signal, and the signal indicating a shift in the Y-axis direction may be described as a second signal.

The signals output by outputter 60 have been described above.

Figure 9:
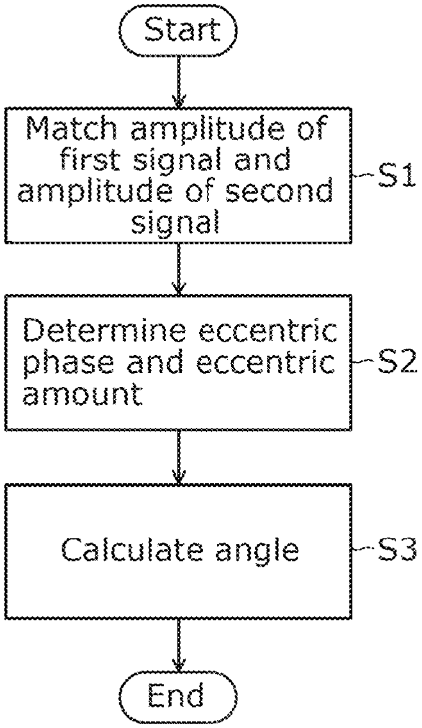
FIG. 9 is a flow chart illustrating an example of a calculation method performed by a calculator of the encoder in FIG. 1.

FIG. 9 is a flow chart illustrating an example of the calculation method performed by calculator 70 of encoder 10 in FIG. 1. An example of the calculation method performed by calculator 70 will be described with reference to FIG. 9.

As illustrated in FIG. 9, first, calculator 70 matches the amplitude of the first signal and the amplitude of the second signal (step S1). As described above, the first signal is a signal indicating a shift in the X-axis direction, and the second signal is a signal indicating a shift in the Y-axis direction.

After matching the amplitude of the first signal and the amplitude of the second signal, calculator 70 determines the eccentric phase of axis B relative to rotation axis A and the eccentric amount of axis B relative to rotation axis A (step S2). For example, the eccentric phase of axis B relative to rotation axis A is calculated using the value of X indicated by the first signal and the value of Y indicated by the second signal. Also, for example, the eccentric amount of axis B relative to rotation axis A is calculated from the amplitude of the first signal. Furthermore, for example, the eccentric amount of axis B relative to rotation axis A is calculated from a function or a table prepared in advance. Note that the amplitude used for calculating the eccentric amount may be sequentially determined from a square root of sum of squares of the first signal and the second signal whose amplitudes have been matched. Specifically, for example, the amplitude, which is denoted by G and is used for calculating the eccentric amount, may be calculated in real time by the equation below.

$$G = \sqrt{X^2 + Y^2} \quad \text{[Math. 1]}$$

Calculator 70 calculates an angle after determining the eccentric phase and the eccentric amount (step S3). For example, a true detection address, which is denoted by P1, is calculated by $P1=P+\tan^{-1}(\Delta r\times\sin\Phi/r)$. Here, as described above, P denotes a rotation angle of rotary plate 20 detected based on light emitted from emitter 40 and, after being incident on one or more patterns, received by light receiver 50, r denotes the radius of annular region 26, Δr denotes an eccentric amount of axis B of annular region 26 relative to rotation axis A, and Φ denotes an eccentric phase of axis B of annular region 26 relative to rotation axis A.

An example of the calculation method performed by calculator 70 has been described above.

Figure 10:
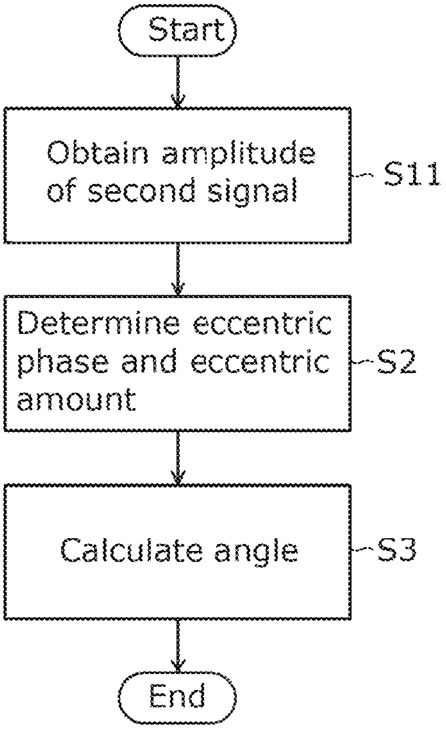
FIG. 10 is a flow chart illustrating another example of a calculation method performed by the calculator of the encoder in FIG. 1.

FIG. 10 is a flow chart illustrating another example of the calculation method performed by calculator 70 of encoder 10 in FIG. 1. Another example of the calculation method performed by calculator 70 will be described with reference to FIG. 10. Note that the following description mainly focuses on the differences from the example of the calculation method illustrated in FIG. 9.

As illustrated in FIG. 10, first, calculator 70 obtains the amplitude of the second signal (step S11). For example, calculator 70 obtains the amplitude of the second signal prior to one rotation. For example, calculator 70 obtains the amplitude of the second signal from one rotation in a test mode or one rotation in continuous rotations. Specifically, for example, calculator 70 obtains the amplitude of the second signal from arbitrary 360-degree data. Also, for example, calculator 70 obtains the amplitude of the second signal by clipping a peak value from arbitrary 180-degree data.

After obtaining the amplitude of the second signal, calculator 70 determines the eccentric phase of axis B relative to rotation axis A and the eccentric amount of axis B relative to rotation axis A (step S2). For example, calculator 70 estimates the waveform of the second signal from the amplitude of the second signal obtained, and determines the eccentric phase of axis B relative to rotation axis A from: the value of Y indicated by the second signal output from outputter 60; and the increase and decrease tendency of the signal level of the second signal.

In such a manner as described, calculator 70 may calculate the eccentric phase etc., of axis B relative to rotation axis A without using the first signal.

Another example of the calculation method performed by calculator 70 has been described above.

As described above, encoder 10 can more precisely detect the eccentricity of rotary plate 20 relative to detection target 1. In addition, since encoder 10 includes first light-receiving region 55, second light-receiving region 56, third light-receiving region 57, and fourth light-receiving region 58 on single substrate 30, encoder 10 can be downsized and less expensive.

Encoder 10 according to Embodiment 1 has been described above.

Encoder 10 according to Embodiment 1 includes: emitter 40 that emits light; rotary plate 20 that rotates and includes annular region 26 that reflects the light emitted from emitter 40, annular region 26 being provided surrounding rotation axis A of rotary plate 20; and light receiver 50 that receives light emitted from emitter 40 and arriving via annular region 26. Light receiver 50 includes: a first set that includes first light-receiving region 55 and second light-receiving region 56 that are arranged side by side in first direction E intersecting rotation direction C of rotary plate 20; and a second set that includes third light-receiving region 57 and fourth light-receiving region 58 that are arranged side by side in second direction F intersecting rotation direction C and that is provided side by side with the first set in rotation direction C.

Accordingly, light receiver 50 includes: the first set that includes first light-receiving region 55 and second light-receiving region 56 that are arranged side by side in first direction E intersecting rotation direction C of rotary plate 20; and the second set that includes third light-receiving region 57 and fourth light-receiving region 58 that are arranged side by side in second direction F intersecting rotation direction C and that is provided side by side with the first set in rotation direction C. With this, rotation of rotary plate 20 causes a change in the position of light received by first light-receiving region 55, second light-receiving region 56, third light-receiving region 57, and fourth light-receiving region 58, thus enabling precise detection of the eccentricity of rotary plate 20 relative to detection target 1.

Furthermore, encoder 10 according to Embodiment 1 further includes outputter 60 that outputs a signal indicating a value of X expressed as below and a signal indicating a value of Y expressed as below:

$$X=(A1+B2)-(B1+A2)$$

$$Y=(A1+B1)-(A2+B2)$$

where A1 denotes a signal value corresponding to light received by first light-receiving region 55, A2 denotes a signal value corresponding to light received by second light-receiving region 56, B1 denotes a signal value corresponding to light received by third light-receiving region 57, and B2 denotes a signal value corresponding to light received by fourth light-receiving region 58.

Accordingly, it is possible to output a signal corresponding to the position of rotary plate 20, thus enabling further precise detection of the eccentricity of rotary plate 20 relative to detection target 1.

Furthermore, in encoder 10 according to Embodiment 1, outputter 60 outputs a signal indicating a value of Q expressed as below:

$$Q=A1+B1+A2+B2$$

Accordingly, it is possible to output a signal corresponding to the position of rotary plate 20, thus enabling further precise detection of the eccentricity of rotary plate 20 relative to detection target 1.

Furthermore, in encoder 10 according to Embodiment 1, outputter 60 outputs a signal indicating a value of X1 expressed as below and a signal indicating a value of Y1 expressed as below:

$$X1=X/Q$$

$$Y1=Y/Q$$

Accordingly, it is possible to output a signal corresponding to the position of rotary plate 20, thus enabling further precise detection of the eccentricity of rotary plate 20 relative to detection target 1.

Furthermore, in encoder 10 according to Embodiment 1, rotary plate 20 includes one or more patterns for detecting a rotation angle of rotary plate 20, and light receiver 50 includes one or more light-receiving regions that receive light emitted from emitter 40 and arriving via the one or more patterns. Encoder 10 according to Embodiment 1 further includes calculator 70 that calculates a value of P1 expressed as below:

$$P1 = P + \tan^{-1}(\Delta r \times \sin\Phi / r)$$

or $$P1 = P - \tan^{-1}(\Delta r \times \sin\Phi / r)$$

where P denotes a rotation angle of rotary plate 20 detected based on the light emitted from emitter 40 and, after being incident on the one or more patterns, received by the one or more light-receiving regions, Δr denotes an eccentric amount of axis B of annular region 26 relative to rotation axis A, Φ denotes an eccentric phase of axis B relative to rotation axis A, and r denotes the radius of annular region 26.

Outputter 60 outputs a signal indicating the value of P1 calculated by calculator 70.

Accordingly, it is possible to detect the correct position of detection target 1 even in the state in which rotary plate 20 is eccentric relative to detection target 1.

Furthermore, in encoder 10 according to Embodiment 1, emitter 40 is interposed between the first set and the second set in rotation direction C.

Accordingly, it is possible to inhibit reduction of the amount of light received by first light-receiving region 55, second light-receiving region 56, third light-receiving region 57, and fourth light-receiving region 58, thus enabling further precise detection of the eccentricity of rotary plate 20 relative to detection target 1.

Furthermore, in encoder 10 according to Embodiment 1, each of first direction E and second direction F is a direction parallel to straight line G orthogonal to rotation axis A, and the first set and the second set are provided line-symmetrically with respect to straight line G.

It is possible to inhibit reduction of the amount of light received by first light-receiving region 55, second light-receiving region 56, third light-receiving region 57, and fourth light-receiving region 58 and inhibit variation in the amount of light received by first light-receiving region 55, second light-receiving region 56, third light-receiving region 57, and fourth light-receiving region 58, thus enabling further precise detection of the eccentricity of rotary plate 20 relative to detection target 1.

Furthermore, in encoder 10 according to Embodiment 1, dimension L between an end portion of first light-receiving region 55 farther from second light-receiving region 56 and an end portion of second light-receiving region 56 farther from first light-receiving region 55 in first direction E is greater than dimension W2, in the first direction, of light that is emitted from emitter 40 and, after being incident on annular region 26, irradiates first light-receiving region 55 and second light-receiving region 56, and the dimension between an end portion of third light-receiving region 57 farther from fourth light-receiving region 58 and an end portion of fourth light-receiving region 58 farther from third light-receiving region 57 in second direction F is greater than the dimension, in second direction F, of light that is emitted from emitter 40 and, after being incident on annular region 26, irradiates third light-receiving region 57 and fourth light-receiving region 58.

Accordingly, in the state in which rotary plate 20 is eccentric relative to detection target 1, rotation of rotary plate 20 can cause an appropriate change in the position of light received by first light-receiving region 55 and second light-receiving region 56 and the position of light received by third light-receiving region 57 and fourth light-receiving region 58, thus enabling further precise detection of the eccentricity of rotary plate 20 relative to detection target 1.

Furthermore, in encoder 10 according to Embodiment 1, emitter 40 includes a point light source, and expressions below are satisfied:

$$W2 = (h2/h1) \times W1$$

$$W2/L < 1$$

where h1 denotes the dimension between annular region 26 and emitter 40 in an axis direction in which rotation axis A extends, h2 denotes the dimension between annular region 26 and first and the second light-receiving regions 55 and 56 in the axis direction in which rotation axis A extends, L denotes the dimension between the end portion of the first light-receiving region farther from the second light-receiving region and the end portion of the second light-receiving region farther from the first light-receiving region in the first direction, W1 denotes the dimension of the annular region in the first direction, and W2 denotes the dimension, in the first direction, of light that is emitted from the point light source and, after being incident on the annular region, irradiates the first light-receiving region and the second light-receiving region.

Accordingly, in the state in which rotary plate 20 is eccentric relative to detection target 1, rotation of rotary plate 20 can cause an appropriate change in the position of light received by first light-receiving region 55 and second light-receiving region 56, thus enabling further precise detection of the eccentricity of rotary plate 20 relative to detection target 1.

Embodiment 2

Figure 11:
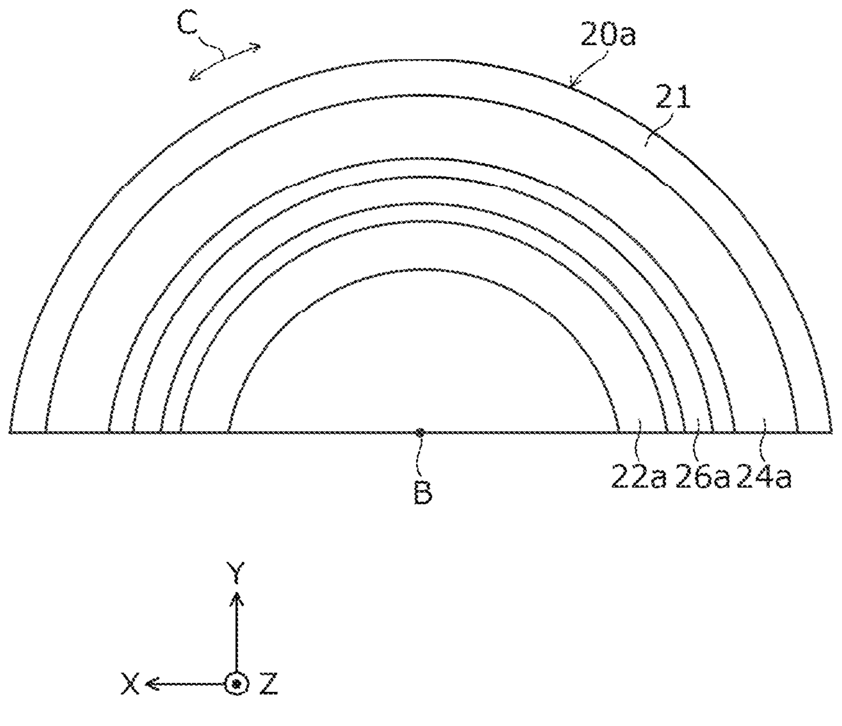
FIG. 11 is a schematic diagram of a rotary plate of an encoder according to Embodiment 2 as viewed in the axis direction.
Figure 12:
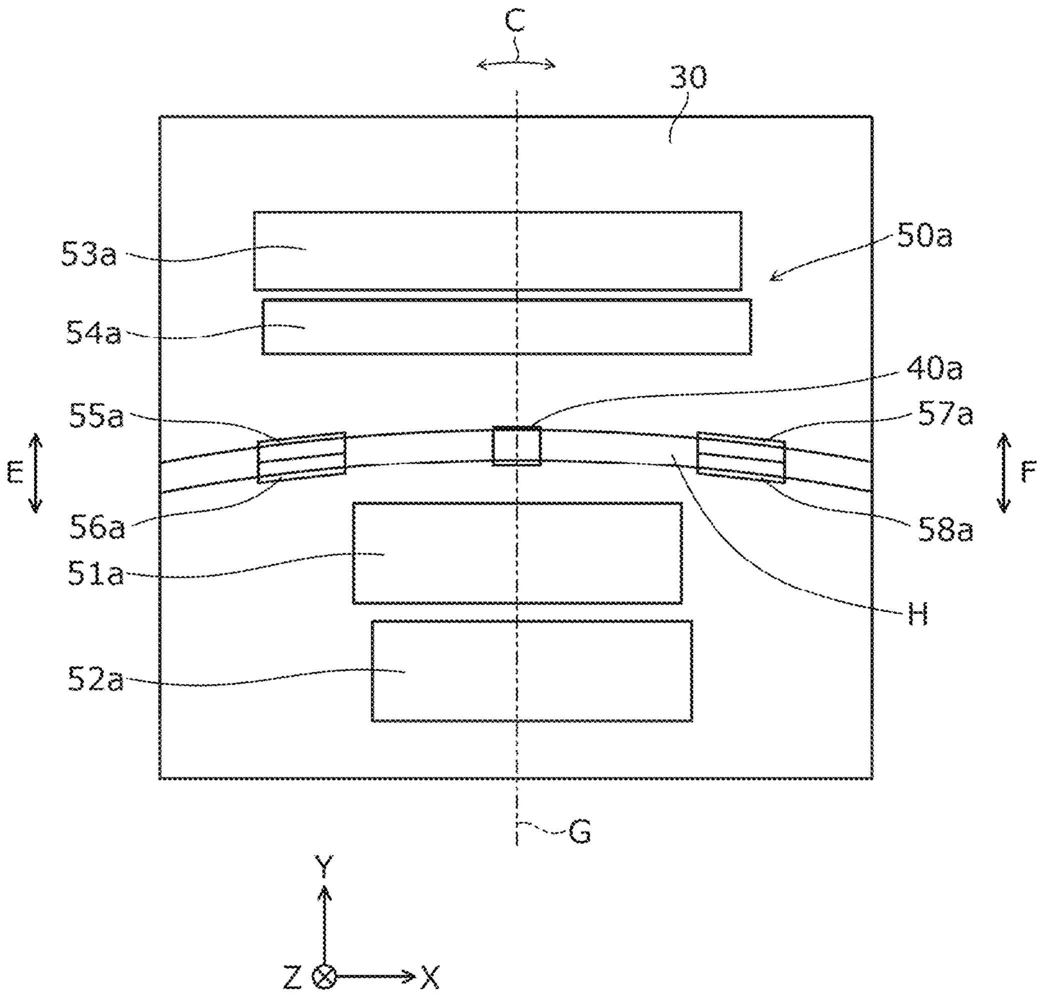
FIG. 12 is a schematic diagram of an emitter and a light receiver of the encoder in FIG. 11 as viewed in the axis direction.

FIG. 11 is a schematic diagram of rotary plate 20*a* of an encoder according to Embodiment 2 as viewed in the axis direction. FIG. 12 is a schematic diagram of emitter 40*a* and light receiver 50*a* of the encoder in FIG. 11 as viewed in the axis direction. A configuration of the encoder according to Embodiment 2 will be described with reference to FIG. 11 and FIG. 12. Note that the following description mainly focuses on the differences from encoder 10 according to Embodiment 1.

Note that FIG. 11 illustrates only the half of rotary plate 20*a* to avoid complication of the drawing.

As illustrated in FIG. 11, the encoder according to Embodiment 2 includes rotary plate 20*a* different from rotary plate 20. Also, as illustrated in FIG. 12, the encoder according to Embodiment 2 includes emitter 40*a* different from emitter 40 and light receiver 50*a* different from light receiver 50. The encoder according to Embodiment 2 is different from encoder 10 mainly in these aspects.

As illustrated in FIG. 11, rotary plate 20*a* includes main body 21, absolute pattern 22*a*, incremental pattern 24*a*, and annular region 26*a*.

Annular region 26*a* is a ring-shaped region that is provided surrounding rotation axis A and reflects the light emitted from emitter 40*a*. Annular region 26*a* reflects toward light receiver 50*a* the light emitted from emitter 40*a*. Annular region 26*a* is provided on the main surface of main body 21 closer to emitter 40*a*. The direction in which axis B of annular region 26*a* extends coincides with the axis direction. For example, annular region 26*a* includes a reflective portion that is annularly disposed in a continuous manner and reflects toward light receiver 50*a* the light emitted from emitter 40*a*.

As illustrated in FIG. 12, emitter 40*a* emits light. Specifically, emitter 40*a* emits light toward rotary plate 20*a*. More specifically, emitter 40*a* emits light toward absolute pattern 22*a*, incremental pattern 24*a*, and annular region 26*a*. Emitter 40*a* is provided on the main surface of substrate 30 closer to rotary plate 20*a*.

Light receiver 50*a* receives light emitted from emitter 40*a* and arriving via annular region 26*a*, for example. Light receiver 50*a* includes first absolute light-receiving region 51*a*, second absolute light-receiving region 52*a*, first incremental light-receiving region 53*a*, second incremental light-receiving region 54*a*, a first set, and a second set.

First absolute light-receiving region 51*a* and second absolute light-receiving region 52*a* each receive light emitted from emitter 40*a* and arriving via absolute pattern 22*a*. First absolute light-receiving region 51*a* and second absolute light-receiving region 52*a* are arranged out of alignment with each other in rotation direction C.

First incremental light-receiving region 53*a* and second incremental light-receiving region 54*a* each receive light emitted from emitter 40*a* and arriving via incremental pattern 24*a*. First incremental light-receiving region 53*a* and second incremental light-receiving region 54*a* are arranged out of alignment with each other in rotation direction C.

The first set includes first light-receiving region 55*a* and second light-receiving region 56*a* that are arranged side by side in first direction E intersecting rotation direction C of rotary plate 20*a*. The second set includes third light-receiving region 57*a* and fourth light-receiving region 58*a* that are arranged side by side in second direction F intersecting rotation direction C, and is provided side by side with the first set in rotation direction C.

An end portion of first light-receiving region 55*a* closer to second light-receiving region 56*a*, an end portion of second light-receiving region 56*a* closer to first light-receiving region 55*a*, an end portion of third light-receiving region 57*a* closer to fourth light-receiving region 58*a*, and an end portion of fourth light-receiving region 58*a* closer to third light-receiving region 57*a* are each in the shape of a straight line extending in the tangential direction with respect to rotation direction C.

Also, an end portion of first light-receiving region 55*a* farther from second light-receiving region 56*a*, an end portion of second light-receiving region 56*a* farther from first light-receiving region 55*a*, an end portion of third light-receiving region 57*a* farther from fourth light-receiving region 58*a*, and an end portion of fourth light-receiving region 58*a* farther from third light-receiving region 57*a* are each in the shape of a straight line extending in the tangential direction with respect to rotation direction C.

The encoder according to Embodiment 2 has been described above.

In the encoder according to Embodiment 2, the end portion of first light-receiving region 55*a* closer to second light-receiving region 56*a*, the end portion of second light-receiving region 56*a* closer to first light-receiving region 55*a*, the end portion of third light-receiving region 57*a* closer to fourth light-receiving region 58*a*, and the end portion of fourth light-receiving region 58*a* closer to third light-receiving region 57*a* are each in the shape of a straight line extending in the tangential direction with respect to rotation direction C.

Accordingly, it is possible to inhibit reduction of the amount of light received by first light-receiving region 55*a*, second light-receiving region 56*a*, third light-receiving region 57*a*, and fourth light-receiving region 58*a*, thus enabling further precise detection of the eccentricity of rotary plate 20*a* relative to detection target 1.

Embodiment 3

Figure 13:
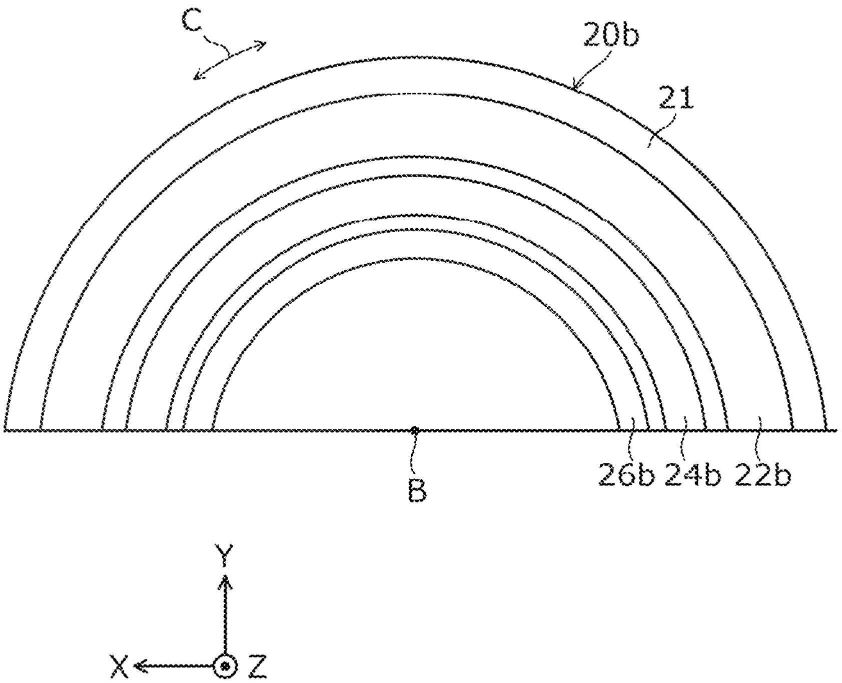
FIG. 13 is a schematic diagram of a rotary plate of an encoder according to Embodiment 3 as viewed in the axis direction.
Figure 14:
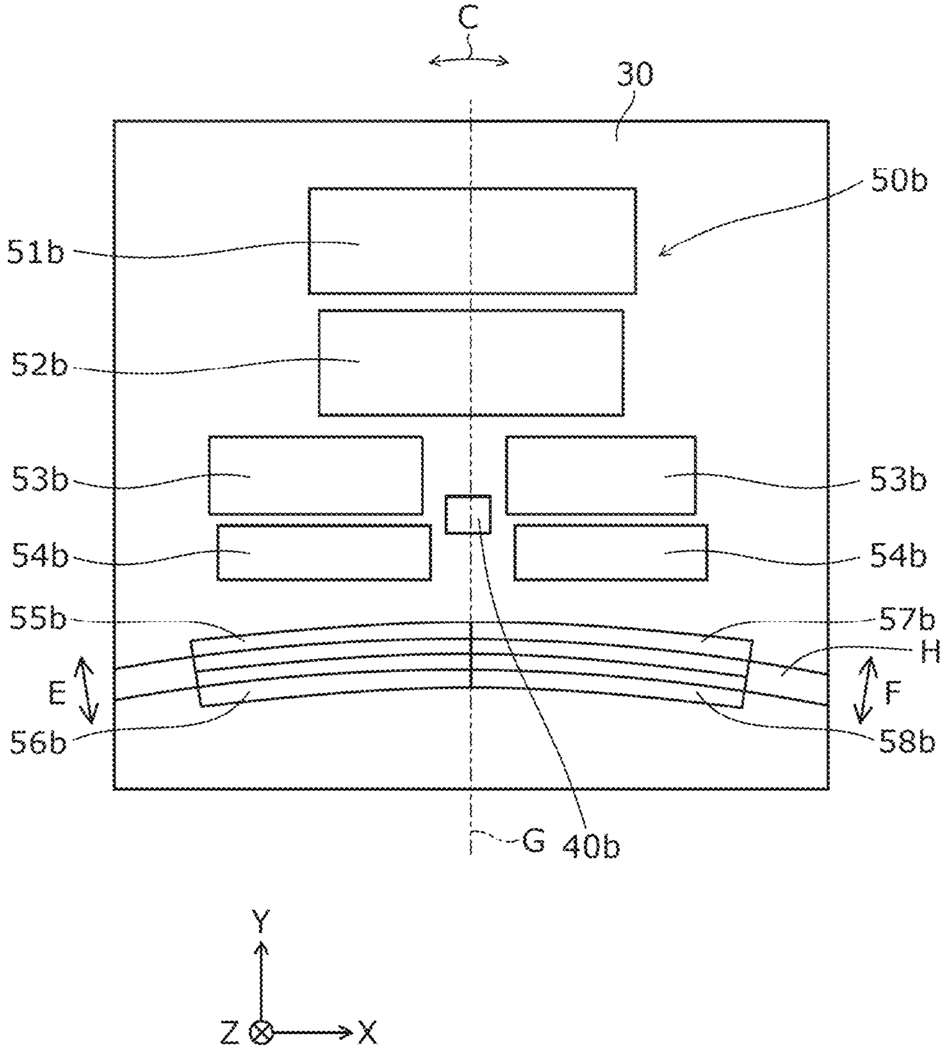
FIG. 14 is a schematic diagram of an emitter and a light receiver of the encoder in FIG. 13 as viewed in the axis direction.

FIG. 13 is a schematic diagram of rotary plate 20*b* of an encoder according to Embodiment 3 as viewed in the axis direction. FIG. 14 is a schematic diagram of emitter 40*b* and light receiver 50*b* of the encoder in FIG. 13 as viewed in the axis direction. A configuration of the encoder according to Embodiment 3 will be described with reference to FIG. 13 and FIG. 14. Note that the following description mainly focuses on the differences from encoder 10 according to Embodiment 1.

Note that FIG. 13 illustrates only the half of rotary plate 20*b* to avoid complication of the drawing.

As illustrated in FIG. 13, the encoder according to Embodiment 3 includes rotary plate 20*b* different from rotary plate 20. Also, as illustrated in FIG. 14, the encoder according to Embodiment 3 includes emitter 40*b* different from emitter 40 and light receiver 50*b* different from light receiver 50. The encoder according to Embodiment 3 is different from encoder 10 mainly in these aspects.

As illustrated in FIG. 13, rotary plate 20*b* includes main body 21, absolute pattern 22*b*, incremental pattern 24*b*, and annular region 26*b*.

Annular region 26*b* is a ring-shaped region that is provided surrounding rotation axis A and reflects the light emitted from emitter 40*b*. Annular region 26*b* reflects toward light receiver 50*b* the light emitted from emitter 40*b*. Annular region 26*b* is provided on the main surface of main body 21 closer to emitter 40*b*. The direction in which axis B of annular region 26*b* extends coincides with the axis direction. For example, annular region 26*b* includes a reflective portion that is annularly disposed in a continuous manner and reflects toward light receiver 50*b* the light emitted from emitter 40*b*.

Annular region 26*b* is located inwardly of absolute pattern 22*b* and incremental pattern 24*b* in the radial direction around axis center B. That is to say, among absolute pattern 22*b*, incremental pattern 24*b*, and annular region 26*b*, annular region 26*b* is located most inwardly in the radial direction.

As illustrated in FIG. 14, emitter 40*b* emits light. Specifically, emitter 40*b* emits light toward rotary plate 20*b*. More specifically, emitter 40*b* emits light toward absolute pattern 22*b*, incremental pattern 24*b*, and annular region 26*b*. Emitter 40*b* is provided on the main surface of substrate 30 closer to rotary plate 20*b*.

Light receiver 50*b* receives, for example, light emitted from emitter 40*b* and arriving via annular region 26*b*. Light receiver 50*b* includes first absolute light-receiving region 51*b*, second absolute light-receiving region 52*b*, first incremental light-receiving regions 53*b*, second incremental light-receiving regions 54*b*, a first set, and a second set.

First absolute light-receiving region 51*b* and second absolute light-receiving region 52*b* each receive light emitted from emitter 40*b* and arriving via absolute pattern 22*b*.

First incremental light-receiving regions 53*b* and second incremental light-receiving regions 54*b* each receive light emitted from emitter 40*b* and arriving via incremental pattern 24*b*.

The first set includes first light-receiving region 55*b* and second light-receiving region 56*b* that are arranged side by side in first direction E intersecting rotation direction C of rotary plate 20*b*. The second set includes third light-receiving region 57*b* and fourth light-receiving region 58*b* that are arranged side by side in second direction F intersecting rotation direction C, and is provided side by side with the first set in rotation direction C.

Each of the first set and the second set is located inwardly of emitter 40*b* in the radial direction around rotation axis A. That is to say, each of first light-receiving region 55*b*, second light-receiving region 56*b*, third light-receiving region 57*b*, and fourth light-receiving region 58*b* is located inwardly of emitter 40*b* in the radial direction around rotation axis A.

An end portion of first light-receiving region 55*b* closer to second light-receiving region 56*b*, an end portion of second light-receiving region 56*b* closer to first light-receiving region 55*b*, an end portion of third light-receiving region 57*b* closer to fourth light-receiving region 58*b*, and an end portion of fourth light-receiving region 58*b* closer to third light-receiving region 57*b* are each in the shape of a curved line extending in rotation direction C.

Also, an end portion of first light-receiving region 55*b* farther from second light-receiving region 56*b*, an end portion of second light-receiving region 56*b* farther from first light-receiving region 55*b*, an end portion of third light-receiving region 57*b* farther from fourth light-receiving region 58*b*, and an end portion of fourth light-receiving region 58*b* farther from third light-receiving region 57*b* are each in the shape of a curved line extending in rotation direction C.

First light-receiving region 55*b*, second light-receiving region 56*b*, third light-receiving region 57*b*, and fourth light-receiving region 58*b* are each in the shape of an arc extending in rotation direction C.

First direction E is a direction that coincides with the radial direction around rotation axis A, and second direction F is a direction that coincides with the radial direction around rotation axis A and intersects first direction E.

First light-receiving region 55*b* and third light-receiving region 57*b* are adjacent to each other in rotation direction C, and second light-receiving region 56*b* and fourth light-receiving region 58*b* are adjacent to each other in rotation direction C.

The encoder according to Embodiment 3 has been described above.

In the encoder according to Embodiment 3, each of the first set and the second set is located inwardly of emitter 40*b* in the radial direction around rotation axis A.

Accordingly, it is possible to more easily bend the light received by first light-receiving region 55*b*, second light-receiving region 56*b*, third light-receiving region 57*b*, and fourth light-receiving region 58*b*, thus enabling further precise detection of the eccentricity of rotary plate 20*b* relative to detection target 1.

Furthermore, in the encoder according to Embodiment 3, an end portion of first light-receiving region 55*b* closer to second light-receiving region 56*b*, an end portion of second light-receiving region 56*b* closer to first light-receiving region 55*b*, an end portion of third light-receiving region 57*b* closer to fourth light-receiving region 58*b*, and an end portion of fourth light-receiving region 58*b* closer to third light-receiving region 57*b* are each in the shape of a curved line extending in rotation direction C.

Accordingly, it is possible to inhibit reduction of the amount of light received by first light-receiving region 55*b*, second light-receiving region 56*b*, third light-receiving region 57*b*, and fourth light-receiving region 58*b*, thus enabling further precise detection of the eccentricity of rotary plate 20*b* relative to detection target 1.

Furthermore, in the encoder according to Embodiment 3, first direction E is a direction that coincides with the radial direction around rotation axis A, and second direction F is a direction that coincides with the radial direction around rotation axis A and intersects first direction E.

It is possible to further inhibit reduction of the amount of light received by first light-receiving region 55*b*, second light-receiving region 56*b*, third light-receiving region 57*b*, and fourth light-receiving region 58*b*, thus enabling further precise detection of the eccentricity of rotary plate 20*b* relative to detection target 1.

Embodiment 4

Figure 15:
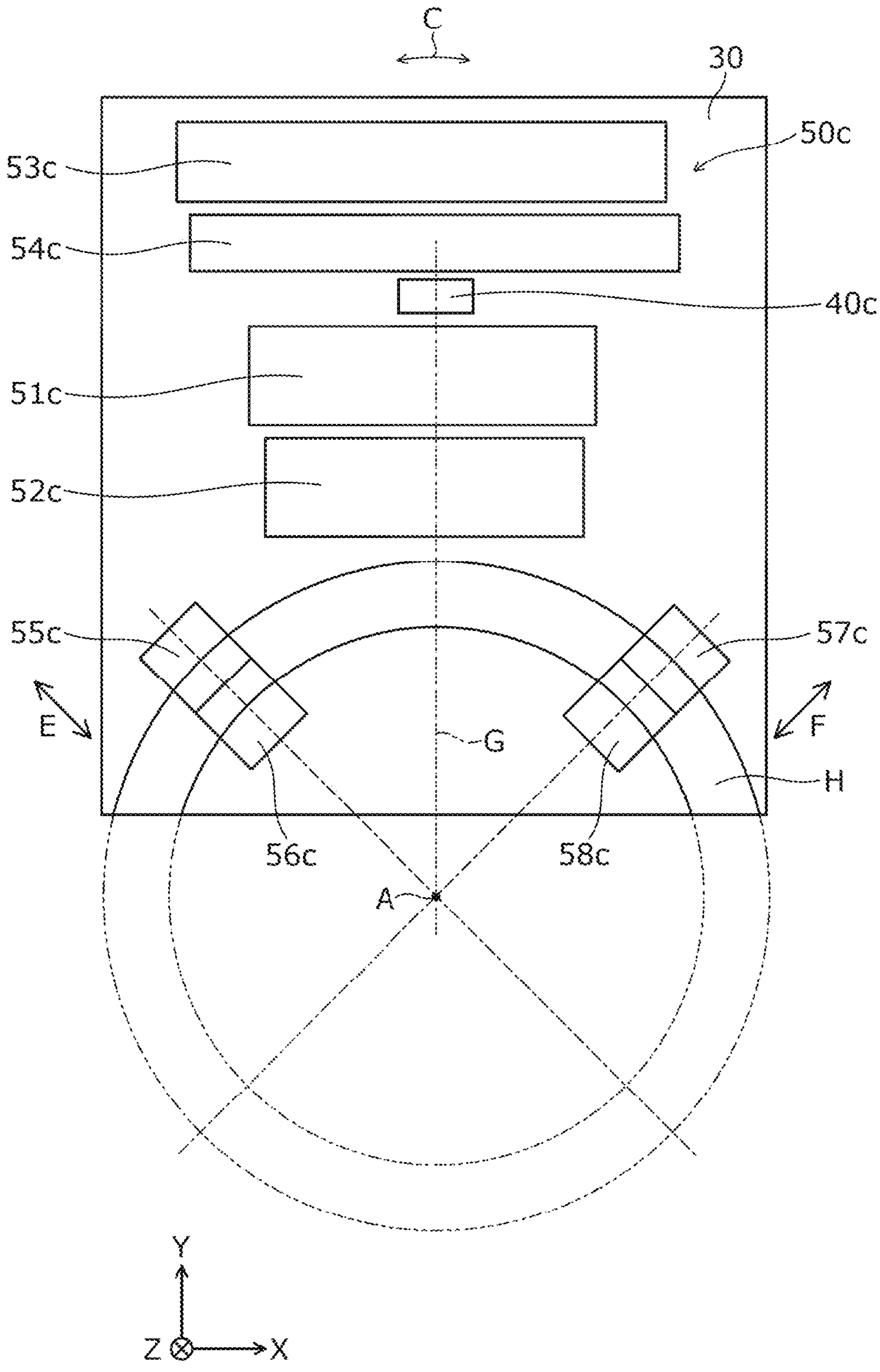
FIG. 15 is a schematic diagram of an emitter and a light receiver of an encoder according to Embodiment 4 as viewed in the axis direction.

FIG. 15 is a schematic diagram of emitter 40*c* and light receiver 50*c* of an encoder according to Embodiment 4 as viewed in the axis direction. A configuration of the encoder according to Embodiment 4 will be described with reference to FIG. 15. Note that the following description mainly focuses on the differences from encoder 10 according to Embodiment 1.

As illustrated in FIG. 15, the encoder according to Embodiment 4 is mainly different from encoder 10 in including a rotary plate (not illustrated) different from rotary plate 20, emitter 40*c* different from emitter 40, and light receiver 50*c* different from light receiver 50.

Emitter 40*c* emits light. Specifically, emitter 40*c* emits light toward the rotary plate. More specifically, emitter 40*c* emits light toward, for example, an annular region (not illustrated) of the rotary plate. Emitter 40*c* is provided on the main surface of substrate 30 closer to the rotary plate.

Light receiver 50*c* receives light emitted from emitter 40*c* and arriving via the annular region of the rotary plate of the encoder according to Embodiment 4, for example. Light receiver 50*c* includes first absolute light-receiving region 51*c*, second absolute light-receiving region 52*c*, first incremental light-receiving region 53*c*, second incremental light-receiving region 54*c*, a first set, and a second set.

First absolute light-receiving region 51*c* and second absolute light-receiving region 52*c* each receive light emitted from emitter 40*c* and arriving via an absolute pattern of the rotary plate.

First incremental light-receiving region 53*c* and second incremental light-receiving region 54*c* each receive light emitted from emitter 40*c* and arriving via an incremental pattern of the rotary plate.

The first set includes first light-receiving region 55*c* and second light-receiving region 56*c* that are arranged side by side in first direction E intersecting rotation direction C of the rotary plate. The second set includes third light-receiving region 57*c* and fourth light-receiving region 58*c* that are arranged side by side in second direction F intersecting rotation direction C, and is provided side by side with the first set in rotation direction C.

A phase difference of 90 degrees is provided between the first set and the second set in rotation direction C. That is to say, the second set is provided at a position shifted from the first set by 90 degrees in rotation direction C.

The encoder according to Embodiment 4 has been described above.

Embodiment 5

Figure 16:
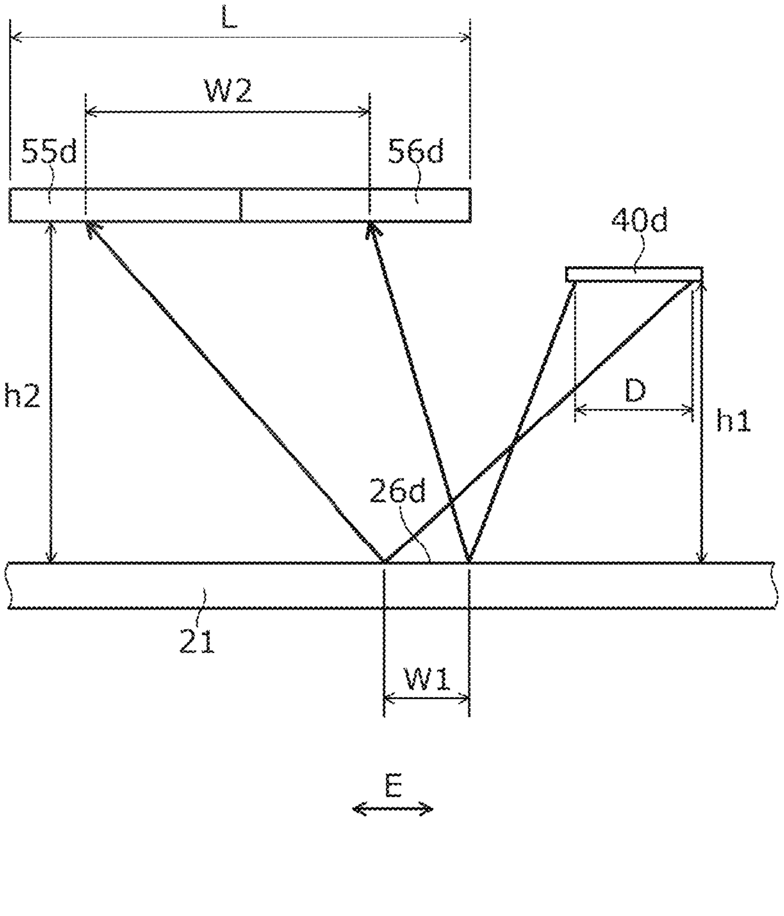
FIG. 16 is an explanatory diagram for describing a relationship between the dimensions of a first light-receiving region and a second light-receiving region and the dimensions of light that irradiates the first light-receiving region and the second light-receiving region in an encoder according to Embodiment 5.

FIG. 16 is an explanatory diagram for describing a relationship between the dimensions of first light-receiving region 55*d* and second light-receiving region 56*d* and the dimensions of light that irradiates first light-receiving region 55*d* and second light-receiving region 56*d* in an encoder according to Embodiment 5. A configuration of the encoder according to Embodiment 5 will be described with reference to FIG. 16.

As illustrated in FIG. 16, in the present embodiment, emitter 40*d* includes a surface light source, and expressions below are satisfied:

$$W2=((h2/h1)+1)\times W1+h2/h1\times D$$

$$W2/L<1$$

where h1 denotes the dimension between annular region 26*d* and emitter 40*d* in an axis direction in which rotation axis A extends, h2 denotes the dimension between annular region 26*d* and first and the second light-receiving regions 55*d* and 56*d* in the axis direction in which rotation axis A extends, L denotes the dimension between the end portion of first light-receiving region 55*d* farther from second light-receiving region 56*d* and the end portion of second light-receiving region 56*d* farther from first light-receiving region 55*d* in first direction E, W1 denotes the dimension of annular region 26*d* in first direction E, W2 denotes the dimension, in first direction E, of light that is emitted from the surface light source and, after being incident on annular region 26*d*, irradiates first light-receiving region 55*d* and second light-receiving region 56*d*, and D denotes the dimension of a light emission port of the surface light source in first direction E. Even if the reflected light on the light-receiving surface moves due to the maximum correctable eccentricity, L is designed to, for example, inhibit the reflected light from going outside the light-receiving regions (first light-receiving region 55*d* and second light-receiving region 56*d*). Note that the same relational expressions are satisfied for a third light-receiving region and a fourth light-receiving region as well.

The encoder according to Embodiment 5 has been described above.

In the encoder according to Embodiment 5, emitter 40*d* includes a surface light source, and expressions below are satisfied:

$$W2=((h2/h1)+1)\times W1+h2/h1\times D$$

$$W2/L<1$$

where h1 denotes the dimension between annular region 26*d* and emitter 40*d* in an axis direction in which rotation axis A extends, h2 denotes the dimension between annular region 26*d* and first and the second light-receiving regions 55*d* and 56*d* in the axis direction in which rotation axis A extends, L denotes the dimension between the end portion of first light-receiving region 55*d* farther from second light-receiving region 56*d* and the end portion of second light-receiving region 56*d* farther from first light-receiving region 55*d* in first direction E, W1 denotes the dimension of annular region 26*d* in first direction E, W2 denotes the dimension, in first direction E, of light that is emitted from the surface light source and, after being incident on annular region 26*d*, irradiates first light-receiving region 55*d* and second light-receiving region 56*d*, and D denotes the dimension of a light emission port of the surface light source in first direction E.

Accordingly, in the state in which the rotary plate is eccentric relative to detection target 1, rotation of the rotary plate can cause an appropriate change in the position of light received by first light-receiving region 55*d* and second light-receiving region 56*d*, thus enabling further precise detection of the eccentricity of the rotary plate relative to detection target 1.

Embodiment 6

Figure 17:
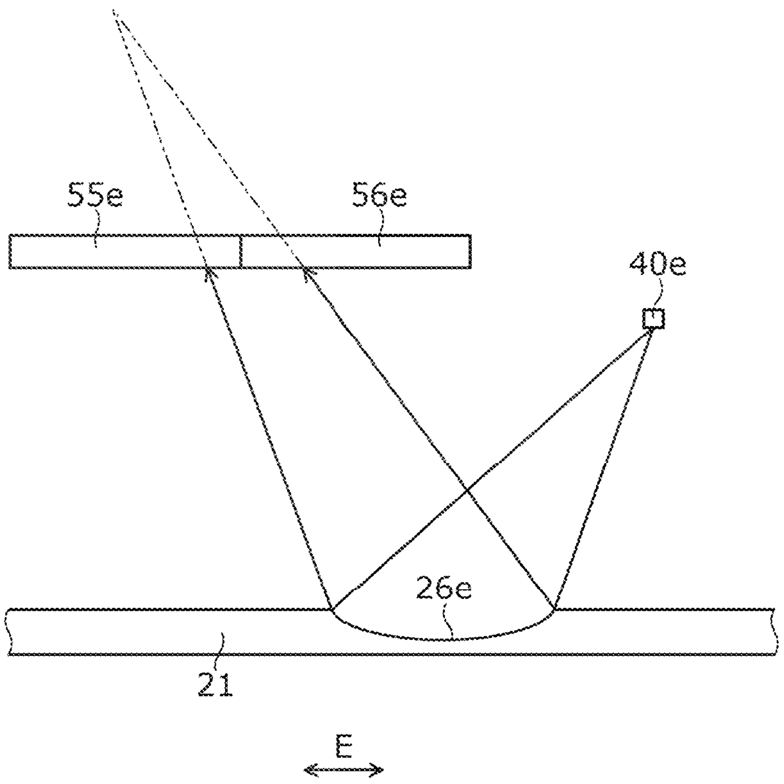
FIG. 17 is an explanatory diagram for describing a relationship between the dimensions of a first light-receiving region and a second light-receiving region and the dimensions of light that irradiates the first light-receiving region and the second light-receiving region in an encoder according to Embodiment 6.

FIG. 17 is an explanatory diagram for describing a relationship between the dimensions of first light-receiving region 55*e* and second light-receiving region 56*e* and the dimensions of light that irradiates first light-receiving region 55*e* and second light-receiving region 56*e* in an encoder according to Embodiment 6. A configuration of the encoder according to Embodiment 6 will be described with reference to FIG. 17. Note that the following description mainly focuses on the differences from encoder 10 according to Embodiment 1.

As illustrated in FIG. 17, the encoder according to Embodiment 6 includes emitter 40*e*, annular region 26*e*, first light-receiving region 55*e*, and second light-receiving region 56*e*.

Annular region 26*e* is recessed in the axis direction in which rotation axis A extends. Light emitted from emitter 40*e* and reflected by annular region 26*e* irradiates first light-receiving region 55*e* and second light-receiving region 56*e* while converging. Similarly, light emitted from emitter 40*e* and reflected by annular region 26*e* also irradiates a third light-receiving region and a fourth light-receiving region while converging.

The encoder according to Embodiment 6 has been described above.

In the encoder according to Embodiment 6, annular region 26*e* is recessed in the axis direction in which rotation axis A extends.

Accordingly, it is possible to inhibit reduction of the intensity of light received by each of first light-receiving region 55*e*, second light-receiving region 56*e*, the third light-receiving region, and the fourth light-receiving region, thus enabling further precise detection of the eccentricity of the rotary plate relative to detection target 1.

Embodiment 7

Figure 18:
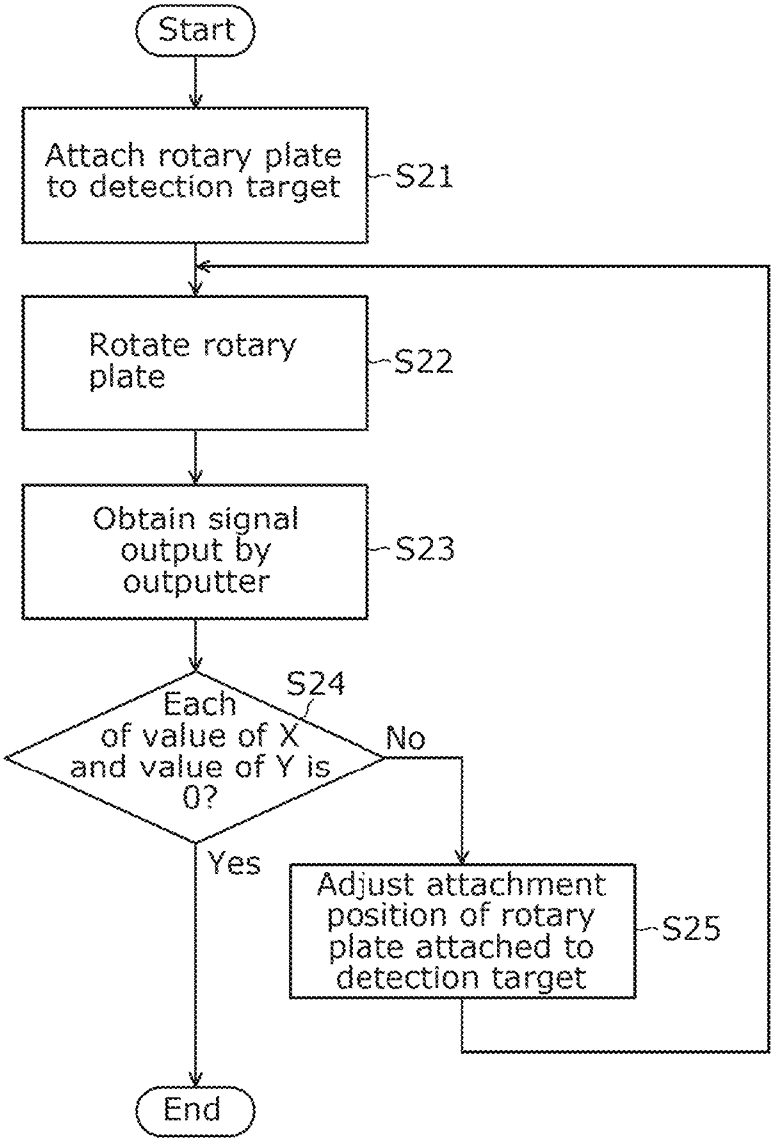
FIG. 18 is a flow chart illustrating an example of an attachment method according to Embodiment 7.

FIG. 18 is a flow chart illustrating an example of an attachment method according to Embodiment 7. An example of the attachment method according to Embodiment 7 will be described with reference to FIG. 18. Described here is an attachment method for attaching encoder 10 to detection target 1.

As illustrated in FIG. 18, first, rotary plate 20 is attached to detection target 1 (step S21). For example, rotary plate 20 is attached to detection target 1 by using a screw, for example.

When rotary plate 20 is attached to detection target 1, rotary plate 20 is rotated about rotation axis A (step S22). Note that rotary plate 20 need not necessarily be rotated.

After rotary plate 20 is rotated about rotation axis A, a signal output by outputter 60 is obtained (step S23). A value of X and a value of Y are obtained from the signal output by outputter 60.

When the signal output by outputter 60 is obtained, it is determined whether each of the value of X and the value of Y is 0 (step S24).

When each of the value of X and the value of Y is not 0 (No in step S24), the attachment position of rotary plate 20 attached to detection target 1 is adjusted (step S25).

In such a manner as described, when each of the value of X and the value of Y is not 0, the attachment position of rotary plate 20 attached to detection target 1 is adjusted, and it is determined again whether each of the value of X and the value of Y is 0. Encoder 10 is attached to detection target 1 at a position where the value of X output by outputter 60 becomes 0 and the value of Y output by outputter 60 becomes 0.

The attachment method according to Embodiment 7 has been described above.

The attachment method according to Embodiment 7 is an attachment method of attaching encoder 10 to detection target 1. Encoder 10 includes: emitter 40 that emits light; rotary plate 20 that rotates and includes annular region 26 that reflects the light emitted from emitter 40, annular region 26 being provided surrounding rotation axis A of rotary plate 20; and light receiver 50 that receives light emitted from emitter 40 and arriving via annular region 26. Light receiver 50 includes: a first set that includes first light-receiving region 55 and second light-receiving region 56 that are arranged side by side in first direction E intersecting rotation direction C of rotary plate 20; and a second set that includes third light-receiving region 57 and fourth light-receiving region 58 that are arranged side by side in second direction F intersecting rotation direction C and that is provided side by side with the first set in rotation direction C. Encoder 10 further includes outputter 60 that outputs a signal indicating a value of X expressed as below and a signal indicating a value of Y expressed as below:

$$X=(A1+B2)-(B1+A2)$$

$$Y=(A1+B1)-(A2+B2)$$

where A1 denotes a signal value corresponding to light received by first light-receiving region 55, A2 denotes a signal value corresponding to light received by second light-receiving region 56, B1 denotes a signal value corresponding to light received by third light-receiving region 57, and B2 denotes a signal value corresponding to light received by fourth light-receiving region 58. The attachment method includes: step S21 of attaching rotary plate 20 to detection target 1; and after attaching rotary plate 20 to detection target 1, step S23 of causing outputter 60 to output the signal indicating the value of X and the signal indicating the value of Y. In the attaching of rotary plate 20 to detection target 1, rotary plate 20 is attached to detection target 1 at a position where the value of X indicated by the signal output by outputter 60 becomes 0 and the value of Y indicated by the signal output by outputter 60 becomes 0.

Accordingly, it is possible to inhibit attachment of encoder 10 in a state in which encoder 10 is eccentric relative to detection target 1.

Other Embodiments Etc.

Embodiments have been described above as examples of the techniques disclosed in the present application. The techniques according to the present disclosure are, however, not limited to these embodiments and are applicable to embodiments or variations resulting from modifications, replacements, additions, omissions as appropriate, so long as they do not depart from the essence of the present disclosure.

In the embodiments described above, annular regions 26 through **26*e*** reflect light; however, the present disclosure is not limited to this. For example, the annular region may transmit the light emitted from the emitter, toward the light receiver.

Note that in the above embodiments, each constituent element may be configured as dedicated hardware or may be realized by executing a software program suitable for the constituent element. Each of the constituent elements may be realized by means of a program executor, such as a central processing unit (CPU) or a processor, reading and executing a software program recorded on a recording medium such as a hard disk or semiconductor memory. Here, the software programs for realizing, for example, the calculation methods and the attachment method according to the above embodiments are computer programs that cause a computer to perform the steps of the flow charts in FIG. 9, FIG. 10, and FIG. 18.

Note that the following cases are also included in the present disclosure.

(1) At least one device described above is specifically a computer system including a microprocessor, ROM, RAM, a hard disk unit, a display unit, a keyboard, and a mouse, for example. A computer program is stored in the RAM or the hard disk unit. At least one device described above achieves its function as a result of the microprocessor operating according to the computer program. Here, the computer program is configured by combining a plurality of instruction codes indicating instructions to be given to the computer, in order to achieve a given function.

(2) Some or all of the constituent elements included in at least one device described above may be configured from a single system large-scale integration (LSI) circuit. A system LSI circuit is a super-multifunction LSI circuit manufactured with a plurality of components integrated on a single chip, and is specifically a computer system including a microprocessor, ROM, and RAM, for example. A computer program is stored in the RAM. The system LSI achieves its function as a result of the microprocessor operating according to the computer program.

(3) Some or all of the constituent elements included in at least one device described above may be configured as an integrated circuit (IC) card that is detachably attached to the device, or as a stand-alone module. The IC or and the module is a computer system including a microprocessor, ROM, and RAM, for example. The IC card or the module may include the super-multifunction LSI circuit described above. The IC card or the module achieves its function as a result of the microprocessor operating according to a computer program. The IC card or the module may be tamperproof.

(4) The present disclosure may be implemented as the methods described above. The present disclosure may also be a computer program that realizes such methods using a computer, or a digital signal including the computer program.

The present disclosure may also be a computer-readable recording medium, such as a flexible disk, a hard disk, a compact disc (CD)-ROM, a DVD, a DVD-ROM, a DVD-RAM, a Blu-ray Disc (BD; registered trademark), semiconductor memory, etc., having recording thereon the computer program or the digital signal. The present disclosure may also be the digital signal recorded on these recording media.

The present disclosure may transmit the computer program or the digital signal via, for example, a telecommunication line, a wireless or wired communication line, a network such as the Internet, or data broadcasting.

The program or the digital signal may be implemented by another independent computer system by recording the program or the digital signal on a recording medium and transporting it or by transporting the program or the digital signal via a network, etc.

INDUSTRIAL APPLICABILITY

The encoders according to the present disclosure can be used in detecting rotation of, for example, the rotary shaft of a motor that rotates and drives a load.

REFERENCE SIGNS LIST

10 encoder
20, 20*a*, 20*b* rotary plate
21 main body
22 first absolute pattern
22*a*, 22*b* absolute pattern
23 second absolute pattern
24 first incremental pattern
24*a*, 24*b* incremental pattern
25 second incremental pattern
26, 26*a*, 26*b*, 26*d*, 26*e* annular region
30 substrate
40, 40*a*, 40*b*, 40*c*, 40*d*, 40*e* emitter
50, 50*a*, 50*b*, 50*c* light receiver
51, 51*a*, 51*b*, 51*c* first absolute light-receiving region
52, 52*a*, 52*b*, 52*c* second absolute light-receiving region
53, 53*a*, 53*b*, 53*c* first incremental light-receiving region
54, 54*a*, 54*b*, 54*c* second incremental light-receiving region
55, 55*a*, 55*b*, 55*c*, 55*d*, 55*e* first light-receiving region
56, 56*a*, 56*b*, 56*c*, 56*d*, 56*e* second light-receiving region
57, 57*a*, 57*b*, 57*c* third light-receiving region
58, 58*a*, 58*b*, 58*c* fourth light-receiving region
60 outputter
70 calculator

The invention claimed is:

1. An encoder comprising:
an emitter that emits light;
a rotary plate that rotates and includes an annular region that reflects or transmits the light emitted from the emitter, the annular region being provided surrounding a rotation axis of the rotary plate; and
a light receiver that receives light emitted from the emitter and arriving via the annular region,
wherein the light receiver includes: a first set that includes a first light-receiving region and a second light-receiving region that are arranged side by side in a first direction intersecting a rotation direction of the rotary plate; and a second set that includes a third light-receiving region and a fourth light-receiving region that are arranged side by side in a second direction intersecting the rotation direction and that is provided side by side with the first set in the rotation direction,
each of the first direction and the second direction is a direction parallel to a straight line orthogonal to the rotation axis,
the first set and the second set are provided line-symmetrically with respect to the straight line, and
the straight line is a line passing through the emitter.

2. The encoder according to claim 1, further comprising:
a processor configured to calculate, from A1, A2, B1, and B2, a value of X and a value of Y and to output a signal indicating the value of X and a signal indicating the value of Y, wherein X and Y represent eccentricity components of the rotary plate relative to the rotation axis along two orthogonal directions, and X and Y are expressed as below:

$$X = (A1 + B2) - (B1 + A2)$$
$$Y = (A1 + B1) - (A2 + B2)$$

where A1 denotes a signal value corresponding to light received by the first light-receiving region,
A2 denotes a signal value corresponding to light received by the second light-receiving region,
B1 denotes a signal value corresponding to light received by the third light-receiving region, and
B2 denotes a signal value corresponding to light received by the fourth light-receiving region.

3. The encoder according to claim 2,
wherein the processor outputs a signal indicating a value of Q, Q represents a sum of the signal values A1, A2, B1, and B2, and Q is expressed as below:

$$Q = A1 + B1 + A2 + B2.$$

4. The encoder according to claim 3,
wherein the processor outputs a signal indicating a value of X1 and a signal indicating a value of Y1, X1 and Y1 represent normalized eccentricity values obtained by normalizing X and Y using Q, respectively, and X1 and Y1 are expressed as below:

$$X1 = X/Q$$
$$Y1 = Y/Q.$$

5. The encoder according to claim 2,
wherein the light receiver further includes one or more additional light receiving regions different from the first light receiving region through the fourth light receiving region,
the processor is configured to calculate a value of P1 and to output a signal indicating the value of P1,
P denotes a rotation angle of the rotary plate,
P1 represents an eccentricity corrected rotation angle of the rotary plate, and
P1 is expressed as below:

$$P1 = P + \tan^{-1}(\Delta r \times \sin\Phi / r)$$

or $$P1 = P - \tan^{-1}(\Delta r \times \sin\Phi / r)$$

where P denotes the rotation angle of the rotary plate detected based on the light emitted from the emitter and, after being incident on the one or more patterns, received by the one or more light-receiving regions,
Δr denotes an eccentric amount of an axis of the annular region relative to the rotation axis,
Φ denotes an eccentric phase of the axis relative to the rotation axis, and
r denotes a radius of the annular region, and the processor outputs a signal indicating the value of P1 calculated by the calculator.

6. The encoder according to claim 1, wherein the emitter is interposed between the first set and the second set in the rotation direction.

7. The encoder according to claim 1, wherein each of the first set and the second set is located inwardly of the emitter in a radial direction around the rotation axis.

8. The encoder according to claim 1, wherein an end portion of the first light-receiving region closer to the second light-receiving region, an end portion of the second light-receiving region closer to the first light-receiving region, an end portion of the third light-receiving region closer to the fourth light-receiving region, and an end portion of the fourth light-receiving region closer to the third light-receiving region are each in a shape of a curved line extending in the rotation direction.

9. The encoder according to claim 1, wherein an end portion of the first light-receiving region closer to the second light-receiving region, an end portion of the second light-receiving region closer to the first light-receiving region, an end portion of the third light-receiving region closer to the fourth light-receiving region, and an end portion of the fourth light-receiving region closer to the third light-receiving region are each in a shape of a straight line extending in a tangential direction with respect to the rotation direction.

10. The encoder according to claim 1, wherein each of the first direction and the second direction is a direction parallel to a straight line orthogonal to the rotation axis, and the first set and the second set are provided line-symmetrically with respect to the straight line.

11. The encoder according to claim 1, wherein the first direction is a direction that coincides with a radial direction around the rotation axis, and the second direction is a direction that coincides with the radial direction around the rotation axis and intersects the first direction.

12. The encoder according to claim 1, wherein a dimension between an end portion of the first light-receiving region farther from the second light-receiving region and an end portion of the second light-receiving region farther from the first light-receiving region in the first direction is greater than a dimension, in the first direction, of light that is emitted from the emitter and, after being incident on the annular region, irradiates the first light-receiving region and the second light-receiving region, and a dimension between an end portion of the third light-receiving region farther from the fourth light-receiving region and an end portion of the fourth light-receiving region farther from the third light-receiving region in the second direction is greater than a dimension, in the second direction, of light that is emitted from the emitter and, after being incident on the annular region, irradiates the third light-receiving region and the fourth light-receiving region.

13. The encoder according to claim 12, wherein the emitter includes a point light source, and expressions below are satisfied:

$$W2 = (h2/h1) \times W1$$

$$W2/L < 1$$

where h1 denotes a dimension between the annular region and the emitter in an axis direction in which the rotation axis extends, h2 denotes a dimension between the annular region and the first and the second light-receiving regions in the axis direction in which rotation axis A extends, L denotes the dimension between the end portion of the first light-receiving region farther from the second light-receiving region and the end portion of the second light-receiving region farther from the first light-receiving region in the first direction, W1 denotes a dimension of the annular region in the first direction, and W2 denotes a dimension, in the first direction, of light that is emitted from the point light source and, after being incident on the annular region, irradiates the first light-receiving region and the second light-receiving region.

14. The encoder according to claim 12, wherein the emitter includes a surface light source, and expressions below are satisfied:

$$W2 = ((h2/h1) + 1) \times W1 + h2/h1 \times D$$

$$W2/L < 1$$

where h1 denotes a dimension between the annular region and the emitter in an axis direction in which the rotation axis extends, h2 denotes a dimension between the annular region and the first and the second light-receiving regions in the axis direction in which the rotation axis extends, L denotes the dimension between the end portion of the first light-receiving region farther from the second light-receiving region and the end portion of the second light-receiving region farther from the first light-receiving region in the first direction, W1 denotes a dimension of the annular region in the first direction, W2 denotes a dimension, in the first direction, of light that is emitted from the surface light source and, after being incident on the annular region, irradiates the first light-receiving region and the second light-receiving region, and D denotes a dimension of a light emission port of the surface light source in the first direction.

15. The encoder according to claim 1, wherein the annular region is recessed in an axis direction in which the rotation axis extends.

16. An attachment method of attaching an encoder to a detection target, wherein the encoder includes:

an emitter that emits light;

a rotary plate that rotates and includes an annular region that reflects or transmits the light emitted from the emitter, the annular region being provided surrounding a rotation axis of the rotary plate; and a light receiver that receives light emitted from the emitter and arriving via the annular region, the light receiver includes: a first set that includes a first light-receiving region and a second light-receiving region that are arranged side by side in a first direction intersecting a rotation direction of the rotary plate; and a second set that includes a third light-receiving region and a fourth light-receiving region that are arranged side by side in a second direction intersecting the rotation direction and that is provided side by side with the first set in the rotation direction, and the encoder further includes:

a processor that outputs a signal indicating a value of X expressed as below and a signal indicating a value of Y expressed as below:

$$X=(A1+B2)-(B1+A2)$$

$$Y=(A1+B1)-(A2+B2)$$

where A1 denotes a signal value corresponding to light received by the first light-receiving region, A2 denotes a signal value corresponding to light received by the second light-receiving region, B1 denotes a signal value corresponding to light received by the third light-receiving region, and B2 denotes a signal value corresponding to light received by the fourth light-receiving region, the attachment method comprising:

attaching the rotary plate to the detection target; and after the attaching, causing the processor to output the signal indicating the value of X and the signal indicating the value of Y, wherein in the attaching, the rotary plate is attached to the detection target at a position where the value of X indicated by the signal output by the processor becomes 0 and the value of Y indicated by the signal output by the processor becomes 0.

* * * * *